3,438,977
6,7-METHYLENE AND 6,7-HALOMETHYLENE PREGNANES AND 19-NORPREGNANES AND PROCESS FOR THEIR PREPARATION
Colin C. Beard, Boulder, Colo., and Alexander D. Cross, Mexico City, Mex., assignors to Syntex Corporation, Panama, Panama, a corporation of Panama
No Drawing. Continuation-in-part of applications Ser. No. 486,226, Sept. 9, 1965, and Ser. No. 499,092, Oct. 20, 1965. This application Apr. 11, 1967, Ser. No. 634,411
Int. Cl. *C07c 173/00, 169/30;* A61k *17/06*
U.S. Cl. 260—239.55                                         40 Claims

ABSTRACT OF THE DISCLOSURE 6,7-methylene-, 6,7-monohalomethylene-, and 6,7-dihalomethylene-3-keto-$\Delta^4$-pregnanes and -19-norpregnanes optionally containing double bond unsaturation at the C-1, 2 position and/or hydrogen, methyl, chloro, or fluoro at C-6, and/or hydrogen, chloro, or fluoro at C-9, and/or hydrogen, hydroxy, keto, or chloro at C-11, and/or hydrogen, methylene, methyl, chloro, fluoro, hydroxy, or acyloxy at C-16, and/or hydrogen, hydroxy, or acyloxy at C-17, and/or alkylidenedioxy at C-16,17, and/or hydrogen, fluoro, chloro, phosphato, tetrahydropyranyl, tetrahydrofuranyl, or acyloxy at C-21, and/or an ortho ester grouping at C-17,21 which compounds exhibit corticoid, anti-inflammatory, and progestational activities and processes for the preparation of such compounds.

---

This is a continuation-in-part of Ser. No. 486,226, filed Sept. 9, 1965, now U.S. Patent No. 3,338,928 and Ser. No. 499,092, filed Oct. 20, 1965 now abandoned.

This invention pertains to novel steroids, in particular to pregnanes and 19-norpregnanes having a cyclopropyl or halocyclopropyl ring fused to the C-6,7 position of the molecule as represented by the following skeletal steroid Formula A in which for convenience and simplicity only the novel grouping is depicted, the wavy line denoting and including both the alpha and beta configurations and each of X and Y being hydrogen, chloro, or fluoro:

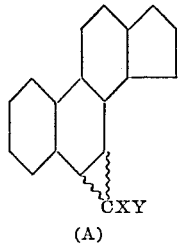

(A)

Specifically, this invention is directed at compounds which are diagrammatically represented by Formula I below:

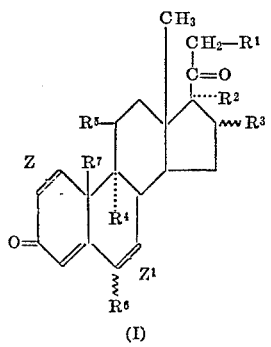

(I)

wherein $R^1$ is hydrogen, hydroxy, fluoro, chloro, phosphato (including mono- and dialkyl metal salts thereof), tetrahydropyran-2-yloxy, tetrahydrofuran-2-yloxy, or a hydrocarbon carboxylic acyloxy group of less than 12 carbon atoms;

$R^2$ is hydrogen, hydroxy, a hydrocarbon carboxylic acyloxy group of less than 12 carbon atoms or, when taken together with $R^1$, one of groups

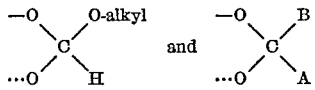

in which A is hydrogen or alkyl of up to 8 carbon atoms and B is hydrogen, or alkyl or aryl of up to 8 carbon atoms;

$R^3$ is hydrogen, methylene, $\alpha$-methyl, $\beta$-methyl, $\alpha$-chloro, $\alpha$-fluoro, $\alpha$-hydroxy, an $\alpha$-hydrocarbon carboxylic acyloxy group of less than 12 carbon atoms or, when taken together with $R^2$, the group

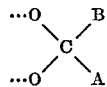

in which A is hydrogen or alkyl of up to 8 carbon atoms and B is hydrogen, or alkyl or aryl of up to 8 carbon atoms;

$R^4$ is hydrogen, chloro, or fluoro;

$R^5$ is hydrogen, hydroxy, keto, or chloro, $R^4$ and $R^5$ being the same when $R^5$ is hydrogen or chloro;

$R^6$ is hydrogen, methyl, chloro, or fluoro;

$R^7$ is hydrogen or methyl;

Z is a carbon-carbon single bond or a carbon-carbon double bond, Z being a single bond when $R^7$ is hydrogen; and $Z^1$ is the group

in which each of X and Y is hydrogen, chloro, or fluoro;

Provided that when each of $R^1$, $R^5$, X, and Y is hydrogen, $R^3$ is hydrogen, methylene, $\alpha$-methyl, $\beta$-methyl, $\alpha$-chloro, or $\alpha$-fluoro.

In the above formulas and in those which follow, the wavy line ($\{$) denotes and includes both the alpha and beta configurations.

The hydrocarbon carboxylic acyl and acyloxy groups of the present invention which are referred to in the above definitions contain less than 12 carbon atoms and can possess a straight, branched, cyclic or cyclic-aliphatic chain structure which is saturated, unsaturated, or aromatic and optionally substituted by functional groups, such as hydroxy, alkoxy containing up to 5 carbon atoms, acyloxy containing up to 12 carbon atoms, nitro, amino, halogeno, and the like. Typical conventional esters thus include acetate, propionate, enanthate, benzoate, trimethylacetate, t-butylacetate, phenoxyacetate, cyclopentylpropionate, aminoacetate, $\beta$-chloropropionate, adamantoate, and the like.

Thus, the compounds of the present invention are of the pregnane and 19-norpregnane steroid series which include substituents characteristic of progestational and corticoid steroids and a methylene, monohalomethylene, or dihalomethylene grouping fused to the C-6,7 carbon atoms.

These compounds demonstrate hormonal properties characterized by corticoid, anti-inflammatory, and progestational activity. They are administered in accordance with this activity via any of the normally employed routes including oral, parenteral, and topical administrations.

For such administrations, the compounds can be suitably formed into a pharmaceutically acceptable non-toxic composition via the incorporation of any of the usually employed excipients taking the form of powders, capsules, pellets, pills, solutions, creams, ointments, aerosols, and so forth. In addition, they can be administered in conjunction with other medicinal agents depending upon the specific condition being treated.

In administering these compounds, a convenient daily dosage regimen which can be adjusted according to the degree of affliction is employed. Most conditions respond well to treatment in the order of magnitude usually employed in the case of other compounds so used; that is, via a daily dosage unit of from 0.001 mg. to 10 mg. per kg. of body weight, the remainder being an inert vehicle or combination thereof.

In particular, those compounds of Formula I wherein $R^1$, $F^4$, and $R^5$ are each hydrogen, are progestational agents which are useful in the control and regulation of fertility and in the management of various menstrual disorders. Such compounds also are anabolic agents and possess varying degrees of anti-androgenic, anti-estrogenic, and anti-gonadotrophic activities. A preferred class of these compounds is represented by Formula II:

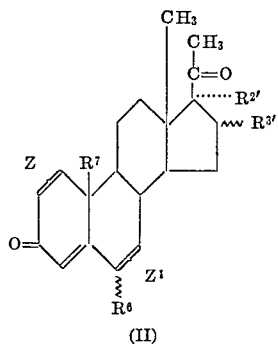

(II)

wherein

Each of $R^6$, $R^7$, Z, and $Z^1$ is as hereinbefore defined;

$R^{2'}$ is hydrogen, hydroxy, or a hydrocarbon carboxyl acyloxy group; and $R^{3'}$ is hydrogen, α-methyl or, when taken together with $R^{2'}$, the group

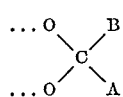

A and B being as previously defined;

Provided that when each of X and Y is hydrogen, $R^{3'}$ is hydrogen or α-methyl.

Those compounds of Formula I, wherein at least one of $R^1$ and $R^5$ is other than hydrogen, demonstrate corticoid and anti-inflammatory activity and are useful in the treatment of inflammatory conditions, such as contact dermatitis, allergies, and the like. A preferred class of these compounds is represented by Formula III:

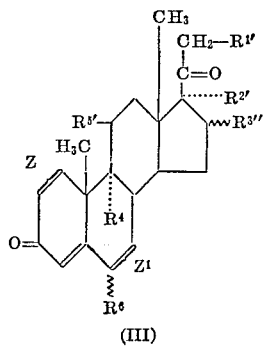

(III)

wherein

Each of $R^4$, $R^6$, Z, and $Z^1$ is as hereinbefore defined;

$R^{1'}$ is hydroxy or fluoro;

$R^{2'}$ is hydrogen, hydroxy, or a hydrocarbon carboxylic acyloxy group of less than 12 carbon atoms;

$R^{3''}$ is hydrogen, α-methyl, α-hydroxy or, when taken together with $R^{2'}$, the group

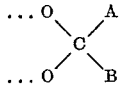

A and B being as previously defined;

$R^{5'}$ is hydroxy or chloro, $R^4$ and $R^5$ being the same when $R^5$ is chloro.

The synthesis of these compounds is accomplished in a number of ways. For those compounds in which at least one of X and Y is chloro or fluoro, a 3-keto-Δ$^{4,6}$-pregnadiene, 3-keto-19-nor-Δ$^{4,6}$-pregnadiene, or a 3-keto-Δ$^{1,4,6}$-pregnatriene is treated with an alkali metal or alkaline earth metal salt of an acid of the formula

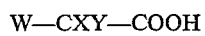

in which W is chloro, bromo, or iodo and X and Y are as above defined, with at least one of X or Y being chloro or fluoro, such as bromochloroacetic acid, dichloroacetic acid, trichloroacetic acid, chlorofluoroacetic acid, dichlorofluoroacetic acid, chlorodifluoroacetic acid, and the like. The process is conducted at a temperature above that at which the salt decomposes, as evidenced by the evolution of carbon dioxide, and in the presence of an inert anhydrous polar organic solvent, such as dimethyl diethylene glycol ether, 5-dimethoxyethane, dimethyl triethylene glycol ether, and the like. In practice, it is also desirable to protect hydroxy groups through the utilization of derivatives which are easily convertible to hydroxy groups, such as esters and tetrahydropyranyl ethers. This preference is not an absolute necessity; however, for while free hydroxy groups will often become involved in side reactions under the conditions of the process, they can be readily regenerated by execution of a mild alkaline hydrolysis after completion of the principal reaction.

In the case where each of X and Y is hydrogen, a 6,7-chloromethylene or 6,7-dichloromethylene compound of the present invention, introduced as outlined above, is reductively dehalogenated as with lithium aluminum hydride in organic solvent. Such a dehalogenation should be followed by an oxidation to regenerate any keto groups, which when unprotected are reduced during the treatment with lithium aluminum hydride. Thus, for example, a 3-keto-6,7-dichloromethylene-Δ$^4$-pregnene is first reductively dehalogenated to a 3-hydroxy-6,7-methylene-Δ$^4$-pregnene which upon treatment with 2,3-dichloro-5,6-dicyanobenzoquinone yields the corresponding 3-keto-6,7-methylene-Δ$^4$-pregnene.

Alternatively, compounds wherein each of X and Y is hydrogen are directly generated by the action of dimethylsulfoxonium methylide in dimethylsulfoxide on a 3-keto-Δ$^{4,6}$-diene.

The addition of the methylene, monohalomethylene, and dihalomethylene groups in accordance with the procedures set forth herein at position C–6,7 is accomplished with the orientation of the resultant fused grouping including both isomeric alpha and beta configurations in variable ratios. The isomeric product mixture in each instance is conveniently and readily subjected to conventional techniques, such as chromatography, fractional crystallization, and the like, by which the alpha and beta isomers are separated by virtue of their different physical properties. Each isomer or isomeric mixture can thereafter be subjected to further elaboration as desired at other parts of the molecule as hereinafter set forth.

In some instances, one particular configurational isomer predominates in the reaction mixture. Thus, for example, the presence of an 11β-hydroxyl oxients the C–6,7 methylene group predominantly to the beta configuration, but does not alter the usual alpha to beta ratio in the halo- 16α-methyl - 17α,20;20,21 - bismethylenedioxypregna-4,6-dien-11β-ol-3-one which is recrystallized from methanol:ether.

A mixture of 1 g. of 16α-methyl-17α,20;20,21-bismethylenedioxypregna-4,6-dien-11β-ol-3-one, 2 g. of chloranil, and 10 ml. of n-amyl alcohol are refluxed under nitrogen for 24 hours. The mixture is then cooled, washed with a cold aqueous solution of 10% sodium hydroxide until the washings are colorless, dried over sodium sulfate, and evaporated. Chromatography of the residue on neutral alumina yields 16α-methyl-17α,20;20,21-bismethylenedioxypregna - 1,4,6-trien-11β-ol-3-one which is further purified through recrystallization from acetone: hexane.

To a gently refluxing and stirred solution of 1 g. of 16α-methyl - 17α,20;20,21-bismethylenedioxypregna - 4,6-dien-11β-ol-3-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried, and chromatographed on alumina, eluting with methylene chloride to yield 6α,7α-difluoromethylene-16α-methyl-17α,20;20,21-bismethylenedioxypregn - 4-en-11β-ol-3-one, M.P. 275–283° C. and 6β,7β-difluoromethylene-16α-methyl-17α,20;20,21 - bismethylenedioxypregn - 4-en-11β-ol-3-one.

A suspension of 1 g. of 6,7-difluoromethylene-16α-methyl-17α,20;20,21 - bismethylenedioxypregn - 4 - en-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-difluoromethylene-16α - methylpregn-4-ene-11β,17α,21-triol-3,20-dione, M.P. 228–232° C., $[\alpha]_D = +82°$, and the 6β,7β isomer which are further purified through recrystallization from isopropanol.

By utilizing 16α-methyl - 17α,20;20,21 - bismethylenedioxypregna-1,4,6-trien-11β-ol-3-one there is obtained according to the foregoing procedures, 6α,7α-difluoromethylene - 16α-methylpregna - 1,4-diene - 11β,17α,21-triol-3,20-dione and 6β,7β-difluoromethylene-16α-methylpregna-1,4-diene-11β,17α,21-triol-3,20-dione.

In like manner, there are thus prepared:

6α,7α-difluoromethylenepregn-4-ene-11β,17α,21-triol-3,20-dione, M.P. 243–246° C., $[\alpha]_D = +2°$;

6α,7α-difluoromethylene-9α-fluoro-16α-methylpregn-4-ene-11β,17α,21-triol-3,20-dione, M.P. 234–236° C.;

6β,7β-difluoromethylene-9α-fluoro-16α-methylpregn-4-ene-11β,17α,21-triol-3,20-dione, M.P. 255–257° C.;

6α,7α-difluoromethylene-9α-fluoro-16α-methyl-17α,20;20,21-bismethylenedioxypregn-4-en-11β-ol-3-one, M.P. 300–303° C., $[\alpha]_D = +10°$;

6β,7β-difluoromethylene-9α-fluoro-16α-methyl-17α,20;20,21-bismethylenedioxypregn-4-en-11β-ol-3-one, $[\alpha]_D = -153°$;

6α,7α-difluoromethylene-17α,20;20,21-bismethylenedioxypregn-4-en-11β-ol-3-one, M.P. 226–230° C., $[\alpha]_D = +35°$;

6α,7α-difluoromethylene-16α-methylpregn-4-ene-11β,21-diol-3,20-dione, M.P. 201–203° C., $[\alpha]_D = +175°$;

6β,7β-difluoromethylene-16α-methylpregn-4-ene-11β,21-diol-3,20-dione, M.P. 230–233° C., $[\alpha]_D = -71°$;

6α,7α-difluoromethylene-16α-methyl-21-acetoxypregn-4-en-11β-ol-3,20-dione, M.P. 223–224° C., $[\alpha]_D = +360°$;

6β,7β-difluoromethylene-16α-methyl-21-acetoxypregn-4-en-11β-ol-3,20-dione, $[\alpha]_D = +31°$;

6α,7α-difluoromethylene-16α-methyl-21-acetoxypregna-1,4-dien-11β-ol-3,20-dione, M.P. 213–214° C., $[\alpha]_D = +80°$; and 6β,7β-difluoromethylene-16α-methyl-21-acetoxypregna-1,4-dien-11β-ol-3,20-dione, M.P. 111–113° C., $[\alpha]_D = -16°$.

In a similar fashion, the following compounds are also thus obtained from the bismethylenedioxy derivatives of the corresponding starting material and the two isomers separated by chromatography:

6,7-difluoromethylene-16β-methylpregn-4-ene-11β,17α,21-triol-3,20-dione;

6,7-difluoromethylene-16α-methylpregn-4-ene-17α,21-diol-3,20-dione;

6,7-difluoromethylene-16α-chloropregn-4-ene-11β,17α,21-triol-3,20-dione;

6,7-difluoromethylene-16α-fluoropregn-4-ene-11β,17α,21-triol-3,20-dione;

6β,7β-difluoromethylenepregn-4-ene-11β,17α,21-triol-3,20-dione;

6,7-difluoromethylenepregn-4-ene-11β,16α,17α,21-tetrol-3,20-dione;

6,7-difluoromethylenepregn-4-ene-11β,17α,21-triol-3,20-dione;

6,7-difluoromethylene-16α-methylpregna-1,4-diene-17α,21-diol-3,11,20-trione;

6,7-difluoromethylene-16α-methylpregna-1,4-diene-11β,17α,21-triol-3,20-dione;

6β,7β-difluoromethylenepregn-4-ene-11β,17α,21-triol-3,20-dione;

6,7-difluoromethylene-6β-methylpregn-4-ene-11β,17α,21-triol-3,20-dione;

6,7-difluoromethylene-6β,16α-dimethylpregn-4-ene-11β,17α,21-triol-3,20-dione;

6,7-difluoromethylene-6β,16β-dimethylpregn-4-ene-11β,17α,21-triol-3,20-dione;

6,7-difluoromethylene-6β-fluoropregn-4-ene-11β,17α,21-triol-3,20-dione;

6,7-difluoromethylene-6β-fluoro-16α-methylpregn-4-ene-11β,17α,21-triol-3,20-dione;

6,7-difluoromethylene-6β-fluoro-16β-methylpregn-4-ene-11β,17α,21-triol-3,20-dione;

6,7-difluoromethylene-9α-fluoropregn-4-ene-11β,17α,21-triol-3,20-dione;

6,7-difluoromethylene-9α-fluoro-16β-methylpregn-4-ene-11β,17α,21-triol-3,20-dione;

6,7-difluoromethylene-9α-chloropregn-4-ene-11β,17α,21-triol-3,20-dione;

6,7-difluoromethylene-9α-chloro-16α-methylpregn4-ene-11β,17α,21-triol-3,20-dione;

6,7-difluoromethylene-9α-chloro-16β-methylpregn-4-ene-11β,17α,21-triol-3,20-dione;

6,7-difluoromethylene-9α-fluoro-6β-methylpregn-4-ene-11β,17α,21-triol-3,20-dione 6,7-difluoromethylene-9α-fluoro-6β,16α-dimethylpregn-4-ene-11β,17α,21-triol-3,20-dione;

6,7-difluoromethylene-9α-fluoro-6β,16β-dimethylpregn-4-ene-11β,17α,21-triol-3,20-dione;

6,7-difluoromethylene-6β,9α,-difluoropregn-4-ene-11β,17α,21-triol-3,20-dione;

6,7-difluoromethylene-6β,9α-difluoro-16α-methylpregn-4-ene-11β,17α,21-triol-3,20-dione;

6,7-difluoromethylene-6β,9α-difluoro-16β-methylpregn-4-ene-11β,17α,21-triol-3,20-dione;

6,7-difluoromethylene-9α,11β-dichloropregn-4-ene-17α,21-diol-3,20-dione;

6,7-difluoromethylene-9α,11β-dichloro-16α-methylpregn-4-ene-17α,21-diol-3,20-dione;

6,7-difluoromethylene-9α,11β-dichloro-16β-methylpregn-4-ene-17α,21-diol-3,20-dione;

6,7-difluoromethylene-6β-fluoro-9α,11β-chloropregn-4-ene-17α,21-diol-3,20-dione;

6,7-difluoromethylene-6β-fluoro-9α,11β-dichloro-16α-methylpregn-4-ene-17α,21-diol-3,20-dione;

methylene series. Beta addition in the halomethylene series is favored by the presence of a 9α-halo substituent.

It will be understood that each of the isomers in each series is included within the scope of this invention.

In the preferred embodiment of this invention, compounds possessing the 17α,21-dihydroxy-20-keto substituents are protected prior to the principal reactions by which the methylene and halomethylene groups are introduced at C-6,7, through formation of the 17α,20;20,21-bismethylene-dioxy derivative according to conventional procedures, such as with formaldehyde in the presence of acid. When $R^3$ is hydroxy, protection may alternatively be realized through formation of the 16α,17α-isopropylidenedioxy-21-tetrahydropyranyloxy derivative.

Compounds which do not possess the 17α,21-dihydroxy system may be directly subjected to the principal processes of this invention. Hydroxy groups, as previously noted, are preferably protected as through formation of an ester or tetrahydropyranyl ether.

Starting compounds are chosen which already possess the necessary unsaturation between the C-6,7 carbon atoms, for the principal reactions hereof described above, and other elaboration at other parts of the molecule as desired.

As previously described, the introduction of the 6,7-methylene or -halomethylene group is effected with compounds already bearing a $\Delta^{4,6}$-diene or $\Delta^{1,4,6}$-triene system. The $\Delta^{4,6}$-diene unsaturation is introduced by treatment of a $\Delta^4$-ene with chloranil in the presence of ethyl acetate and acetic acid, the $\Delta^{1,4,6}$-triene unsaturation by treatment of the $\Delta^{4,6}$-diene with chloranil in the presence of (lower)alkanol, such as n-amyl alcohol. Alternatively, the $\Delta^{1,4}$-diene system can be introduced at a subsequent stage, such as with 2,3-dichloro-5,6-dicyanobenzoquinone.

21-fluoro, 21-chloro, 21-phosphato, and 21-unsubstituted derivatives are prepared from the corresponding 21-hydroxy compound, obtained upon hydrolysis of the 17α,20;20,21-bismethylenedioxy intermediate with hydrofluoric acid or formic acid. Thus, the 21-hydroxy compound is treated with methanesulfonyl chloride and the resulting ester is then converted to the corresponding 21-iodo intermediate by the action of sodium iodide. The 21-iodo intermediate upon the action of silver fluoride, silver chloride or silver phosphate, and phosphoric acid yields the corresponding 21-fluoro, 21-chloro, or 21-phosphato compounds, respectively. Treatment of the 21-iodo intermediate instead with sodium metabisulfite yields the 21-unsubstituted compound whereas treatment with potassium acetate (or other alkanoates) yields the 21-acetoxy (or 21-alkanoates). The 21-iodo intermediate can also be obtained from 21-unsubstituted compounds through bromination and treatment with sodium iodide. Tetrahydropyran-2-yloxy and tetrahydrofuran-2-yloxy groups are introduced by treating the hydroxy compound with dihydropyran and dihydrofuran, respectively, in the presence of an arylsulfonic acid derivative catalyst.

The C-17,21-ortho esters, herein designated as 17α,21-(1-alkoxyalk-1,1-ylidenedioxy) derivatives, are obtained through the action of a lower alkyl ortho ester (alkyl orthoalkanoate) on a 17α,21-dihydroxy compound. Thus, by the use of methyl orthocaproate, there is formed the corresponding 17α,21-(1-methoxyhex-1,1-ylidenedioxy) derivative. Similarly, the corresponding 17α,21-(1-alkoxyalk-1,1-ylidenedioxy) derivatives are formed by use of alternate alkyl orthoalkanoates, such as methyl orthoacetate, methyl orthopropionate, methyl orthovalerate, and the like.

These 17α,21-orthoesters, upon treatment with hydrochloric acid at room temperature or upon warming with oxalic acid, are cleaved to yield a 17α-acylate. For example, a 17α,21-(1-methoxypent-1,1-ylidenedioxy) derivative, obtained through the use of methyl orthovalerate, yields upon treatment with hydrochloric acid the corresponding 17α-pentanoyloxy-21-hydroxy derivative.

17α,21-ketals and acetals are prepared through treatment of a 17α,21-dihydroxy compound with a ketone or aldehyde in the presence of an acid catalyst with protection of a 16α-hydroxy group, when present, through prior acetylation.

With the exception of methylene, the substituents represented by $R^3$ are present in the starting material as qualified above when $R^3$ is hydroxy. The 16-methylene substituent is introduced after the principal reactions by formation of the 3,20-bis semicarbazone and treatment with acetic acid and pyruvic acid to yield the 3,20-diketo-$\Delta^{16}$-ene. Treatment of this compound with diazomethane and pyrolysis produces the corresponding 16-methyl-$\Delta^{16}$-ene, and epoxidation as with perbenzoic acid, and ring opening with hydrogen bromide in acetic acid affords the 16-methylene-17-ols.

Tertiary hydroxyl esterification procedures provide the 17α-esters hereof. 16α,17α-acetals and ketals are prepared through treatment of a 16α,17α-dihydroxy compound with a ketone or aldehyde in the presence of an acid, such as perchloric acid. The resulting acetal or ketal, for example, a 16α,17α-isopropylidenedioxy derivative, may be utilized as a final compound or as an intermediate, the group being cleaved with regeneration of the diol by the action of hydrofluoric acid.

The substituents represented by $R^4$ and $R^5$ can be present in the starting material or can be subsequently introduced via conventional procedures. Thus, an 11β-hydroxy compound is dehydrated to yield the $\Delta^{9(11)}$-ene. This is converted to the 9β,11β-oxido compound through the bromohydrin intermediate. Treatment of the oxide with hydrogen fluoride or hydrogen chloride then yields the 9α-fluoro-11β-hydroxy or 9α-chloro-11β-hydroxy compounds. Alternatively, the $\Delta^{9(11)}$-ene is treated with chlorine to yield the 9α,11β-dichloro compound.

The substituents represented by $R^6$ and $R^7$ are likewise preferably present in the starting material although the 6-methyl group can be introduced by treating a 3-keto-$\Delta^{4,6}$-diene with methylmagnesium bromide and cuprous chloride and thereafter regenerating the $\Delta^{4,6}$-diene system and the 6-chloro and 6-fluoro groups can be introduced upon treatment of the enol ether (prepared from the 3-keto-$\Delta^4$-ene with ethyl orthoformate) with N-chlorosuccinimide and perchloryl fluoride, respectively, followed again by duoble bond regeneration. The regeneration of the double band between C-6,7 follows upon treatment of the 3-keto-6-substituted-$\Delta^4$ derivatives with chloranil to give the corresponding $\Delta^{4,6}$-diene directly or by first forming the enol ether of the 6-substituted compound and treating this with 2,3-dichloro-5,6-dicyanobenzoquinone in the presence of p-toluenesulfonic acid to alternatively give the corresponding $\Delta^{4,6}$-diene compound.

Also contemplated by the present invention are the 2-methyl derivatives of Formula I above. The 2-methyl group can be introduced by use of ethyl formate and sodium hydride followed by reduction of the 2-hydroxymethylene group thus formed to the methyl.

The following examples will serve to further typify the nature of this invention. As these are presented solely for the purpose of illustration, they should not be construed as a limitation on the scope of this invention. In some instances for convenience, the various isomeric forms are specified; however, it will be understood that in any of the reaction steps both the alpha and beta isomers at C-6,7 are included within the scope hereof.

Example 1

To a solution of 5 g. of 16α-methylpregna-4,6-diene-11β,17α,21-triol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 6,7-difluoromethylene-6β-fluoro-9α,11β-dichloro-16β-methylpregn-4-ene-17α,21-diol-3,20-dione;
6,7-difluoromethylene-6β-methyl-9α,11β-dichloropregn-4-ene-17α,21-diol-3,20-dione;
6,7-difluoromethylene-6β,16α-dimethyl-9α,11β-dichloropregn-4-ene-17α,21-diol-3,20-dione;
6,7-difluoromethylene-6β,16β-dimethyl-9α,11β-dichloropregn-4-ene-17α,21-diol-3,20-dione;
6,7-difluoromethylene-9α-chloro-16β-methylpregna-1,4-diene-11β,17α,21-triol-3,20-dione;
6,7-difluoromethylene-9α-fluoro-6β-methylpregna-1,4-diene-11β,17α,21-triol-3,20-dione;
6,7-difluoromethylene-9α-fluoro-6β,16α-dimethylpregna-1,4-diene-11β,17α,21-triol-3,20-dione;
6,7-difluoromethylene-9α-fluoro-6β,16β-dimethylpregna-1,4-diene-11β,17α,21-triol-3,20-dione;
6,7-difluoromethylene-6β,9α-difluoropregna-1,4-diene-11β,17α,21-triol-3,20-dione;
6,7-difluoromethylene-6β,9α-difluoro-16α-methylpregn-4-ene-11β,17α,21-triol-3,20-dione;
6,7-difluoromethylene-6β,9α-difluoro-16β-methylpregna-1,4-diene-11β,17α,21-triol-3,20-dione;
6,7-difluoromethylene-9α,11β-dichloropregna-1,4-diene-11β,17α,21-diol-3,20-dione;
6,7-difluoromethylene-9α,11β-dichloro-16α-methylpregna-1,4-diene-17α,21-diol-3,20-dione;
6,7-difluoromethylene-9α,11β-dichloro-16β-methylpregna-1,4-diene-17α,21-diol-3,20-dione;
6,7-difluoromethylene-6β-fluoro-9α,11β-dichloropregna-1,4-diene-17α,21-diol-3,20-dione;
6,7-difluoromethylene-6β-fluoro-9α,11β-dichloro-16α-methylpregna-1,4-diene-17α,21-diol-3,20-dione;
6,7-difluoromethylene-6β-methylpregna-1,4-diene-11β,17α,21-triol-3,20-dione;
6,7-difluoromethylene-6β,16α-dimethylpregna-1,4-diene-11β,17α,21-triol-3,20-dione;
6,7-difluoromethylene-6β,16β-dimethylpregna-1,4-diene-11β,17α,21-triol-3,20-dione;
6,7-difluoromethylene-6β-fluoropregna-1,4-diene-11β,17α,21-triol-3,20-dione;
6,7-difluoromethylene-6β-fluoro-16α-methylpregna-1,4-diene-11β,17α,21-triol-3,20-dione;
6,7-difluoromethylene-6β-fluoro-16β-methylpregna-1,4-diene-11β,17α,21-triol-3,20-dione;
6,7-difluoromethylene-9α-fluoropregna-1,4-diene-11β,17α,21-triol-3,20-dione;
6,7-difluoromethylene-9α-fluoro-16α-methylpregna-1,4-diene-11β,17α,21-triol-3,20-dione;
6,7-difluoromethylene-9α-fluoro-16β-methylpregna-1,4-diene-11β,17α,21-triol-3,20-dione;
6,7-difluoromethylene-9α-chloropregna-1,4-diene-11β,17α,21-triol-3,20-dione;
6,7-difluoromethylene-9α-chloro-16α-methylpregna-1,4-diene-11β,17α,21-triol-3,20-dione;
6,7-difluoromethylene-6β,11β-dichloro-16β-methylpregna-1,4-diene-17α,21-diol-3,20-dione;
6,7-difluoromethylene-6β-methyl-9α,11β-dichloropregna-1,4-diene-11β,17α,21-diol-3,20-dione;
6,7-difluoromethylene-6β,16α-dimethyl-9α,11β-dichloropregna-1,4-diene-17α,21-diol-3,20-dione;
6,7-difluoromethylene-6β,16β-dimethyl-9α,11β-dichloropregna-1,4-diene-17α,21-diol-3,20-dione;
6,7-difluoromethylene-16α-chloropregna-1,4-diene-11β,17α,21-triol-3,20-dione;
6,7-difluoromethylene-16α-fluoropregna-1,4-diene-11β,17α,21-triol-3,20-dione;
6,7-difluoromethylenepregna-1,4-diene-17α,21-diol-3,20-dione;
6,7-difluoromethylenepregna-1,4-diene-11β,16α,17α,21-tetrol-3,20-dione; and
6,7-difluoromethylenepregna-1,4-diene-11β,17α,21-triol-3,20-dione.

The 16α-chloro and 16α-fluoro starting materials employed for the above may be obtained in the following manner. 20,21-oxidopregna-4,16-dien-11β-ol-3-one is treated with hydrogen fluoride and then acetic anhydride in the manner described by Magerlein et al., J. Med. Chem. 7, 748 (1964) to yield 16α-fluoro-21-acetoxypregna-4,17(20)-dien-11β-ol-3-one or with hydrogen chloride and then acetic acid in the manner of Kagan et al., J. Med. Chem. 7, 751 (1964) to yield 16α-chloro-21-acetoxypregna-4,17(20)-dien-11β-ol-3-one. Each of these compounds is then oxidized with osmium tetroxide and N-methylmorpholine oxide-hydrogen peroxide, as described in both of these references, to yield 16α-fluoro-21-acetoxypregn-4-ene-11β,17α-diol-3,20-dione and 16α-chloro-21-acetoxypregn-4-ene-11β,17α-diol-3,20-dione, which are hydrolyzed with base to yield the free 21-hydroxy compounds used in forming the bismethylenedioxy starting materials.

The requisite pregna-1,4,6-triene starting materials employed in preparing the foregoing 6,7-difluoromethylenepregna-1,4-dienes may be obtained from the corresponding pregn-4-enes through the action of chloranil and n-amyl alcohol as described above for the conversion of a pregna-4,6-diene to the corresponding pregna-1,4,6-diene.

Alternatively, the above 6,7-difluoromethylenepregn-4-enes may be converted to the corresponding 6,7-difluoromethylenepregna-1,4-dienes according to the following procedure.

A mixture of 0.5 g. of 6,7-difluoromethylene-16α-methyl-17α,20;20,21-bismethylenedioxypregn-4-en-11β-ol-3-one, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7-difluoromethylene-16α-methyl-17α,20;20,21-bismethylene-dioxypregna-1,4-dien-11β-ol-3-one which is further purified by recrystallization from acetone:hexane. The corresponding 11β,17α,21-trihydroxy-3,20-diketo compound is obtained from the bismethylenedioxy derivative through the action of hydrofluoric acid as described above.

Example 2

A mixture of 1 g. of 6,7-difluoromethylene-16α-methyl-pregn-4-ene-11β,17α,21-triol-3,20-dione, 4 ml. of pyridine, and 2 ml. of acetic anhydride is allowed to stand at room temperature for 15 hours. The mixture is then poured into ice water and the solid which forms is collected by filtration, washed with water, and dried to yield 6,7-difluoromethylene-16α-methyl-21-acetoxypregn-4-ene-11β,17α-diol-3,20-dione which may be further purified through recrystallization from acetone:hexane.

One gram of 6,7-difluoromethylene-16α-methyl-21-acetoxypregn-4-ene-11β,17α-diol-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water, and extracted with ethyl acetate. The extracts are washed with water, dried over sodium sulfate, and evaporated to yield 6,7-difluoromethylene-16α-methyl-21-acetoxypregna-4,9(11)-dien-17α-ol-3,20-dione which may be further purified through recrystallization from acetone: hexane.

Twenty-eight grams of N-bromoacetamide are added over a one hour period with stirring, in the dark and at room temperature, to a mixture of 50 g. of 6,7-difluoromethylene-16α-methyl-21-acetoxypregna-4,9(11)-dien-17α-ol-3,20-dione, 500 ml. of pure dioxane, and 8 ml. of 0.4 N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution, and water and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for ten hours, cooled, and almost all of the acetone is removed by distillation. Iced water is then added and the solid which forms is collected by filtration, washed with water, and dried to yield 6,7-difluoromethylene-9β,11β-oxido-16α-methyl-21-acetoxypregn-4-en-17α-ol-3,20-dione which may be further purified through recrystallization from methylene chloride:benzene.

To a stirred solution of 1.8 g. of 6,7-difluoromethylene-9β,11β-oxido-16α-methyl-21-acetoxypregn - 4 - en-17α-ol-3,20-dione in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for six hours and then neutralized by the cautious addition of 5% aqueous sodium bicarbonate solution. The organic layer is separated, washed with water, dried over sodium sulfate, and concentrated until solid forms. The cooled mixture is then filtered and the solid dissolved in hot ethyl acetate. This solution is filtered hot and then cooled and the solid which forms, collected by filtration to yield 6,7-difluoromethylene-9α-fluoro - 16α - methyl-21-acetoxypregn-4-ene-11β,17α-diol-3,20-dione.

A mixture of 0.5 g. of 6,7-difluoromethylene-9α-fluoro-16α-methyl-21-acetoxypregn-4-ene - 11β,17α - diol-3,20-dione, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7-difluoromethylene-9α-fluoro-16α-methyl-21-acetoxypregna-1,4-diene - 11β,17α - diol-3,20-dione which is further purified by recrystallization from acetone:hexane.

Alternatively, the Δ$^{1,4}$-diene system is introduced in the following manner.

A mixture of 1 g. of 6,7-difluoromethylene-9α-fluoro-16α-methyl-21-acetoxypregna-4-ene-11β,17α - diol - 3,20-dione, 1 g. of selenium dioxide, and 50 ml. of chlorobenzene is refluxed for eight hours. Upon reaching room temperature, the mixture is filtered through Celite diatomaceous earth and a solution of 1.3 g. of sodium acetate in 12.5 ml. of water is then added. This mixture is then steam distilled and the aqueous residue is cooled, acidified with dilute hydrochloric acid, and extracted with chloroform. The residue is then chromatographed on silica gel to yield 6,7-difluoromethylene-9α-fluoro-16α-methyl-21-acetoxypregna-1,4-diene - 11β,17α-diol-3,20-dione which is further purified through recrystallization from acetone.

One gram of 6,7-difluoromethylene-9α-fluoro-16α-methyl-21-acetoxypregna-1,4-diene-11β,17α - diol - 3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6,7-difluoromethylene-9α-fluoro-16α - methylpregn - 1,4-diene-11β,17α,21-triol-3,20-dione which is collected by filtration and recrystallized from acetone:hexane.

By subjecting the appropriate 11β-hydroxy compound to this procedure, the following compounds are obtained, the isomers separable by chromatography:

6,7-difluoromethylene-9α-fluoro-16α-methylpregn-4-ene-11β,17α,21-triol-3,20-dione;
6,7-difluoromethylene-9α-fluoro-16β-methylpregn-4-ene-11β,17α,21-triol-3,20-dione;
6,7-difluoromethylene-9α-fluoro-16α-chloropregn-4-ene-11β,17α,21-triol-3,20-dione;
6,7-difluoromethylene-9α-fluoro-16α-fluoropregn-4-ene-11β,17α,21-triol-3,20-dione;
6,7-difluoromethylene-9α-fluoropregn-4-ene-11β-17α,21-triol-3,20-dione;
6,7-difluoromethylene-9α-fluoro-16β-methylpregna-1,4-diene-11β,17α,21-triol-3,20-dione;
6,7-difluoromethylene-9α-fluoro-16α-chloropregna-1,4-diene-11β-17α,21-triol-3,20-dione;
6,7-difluoromethylene-9α-fluoro-16α-fluoropregna-1,4-diene-11β,17α,21-triol-3,20-dione; and
6,7-difluoromethylene-9α-fluoropregna-1,4-diene-11β,17α,21-triol-3,20-dione.

By utilizing hydrogen chloride in place of hydrogen fluoride, the corresponding 9α-chloro compounds are obtained.

The foregoing compounds possessing a 9α-halo substituent may alternatively be prepared according to the procedure of Example 1.

Example 3

A mixture of 1 g. of 6,7-difluoromethylenepregn-4-ene-11β,17α,21-triol-3,20-dione, 4 ml. of pyridine, and 2 ml. of acetic anhydride is allowed to stand at room temperature for 15 hours. The mixture is then poured into ice water and the solid which forms is collected by filtration, washed with water, and dried to yield 6,7-difluoromethylene - 21 - acetoxy - pregn-4-ene-11β,17α-diol-3,20-dione which may be further purified through recrystallization from acetone:hexane.

To a suspension of 1 g. of 6,7-difluoromethylene-21-acetoxypregn-4-ene-11β,17α-diol-3,20-dione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added. The solid is collected by filtration, washed with water, and dried to yield 6,7-difluoromethylene-21-acetoxypregn-4-ene-11β,17α-diol-3,20-bis semicarbazone which is recrystallized from pyridine:methanol.

A solution of 1 g. of 6,7-difluoromethylene-21-acetoxypregn-4-ene-11β,17α-diol-3,20-bis semicarbazone in 20 ml. of acetic acid and 1 ml. of acetic anhydride is heated at reflux under nitrogen for one hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for two hours and is then diluted with water and extracted with chloroform. These extracts are washed with water, dilute potassium bicarbonate solution and water, dried over magnesium sulfate, and evaporated to dryness under reduced pressure. The residue is chromatographed on neutral alumina with benzene to yield 6,7-difluoromethylene-21-acetoxypregn-4,16-dien-11β-ol-3,20-dione which may be recrystallized from acetone:ether.

A solution of 1 g. of 6,7-difluoromethylene-21-acetoxypregna-4,16-dien-11β-ol-3,20-dione in 30 ml. of an ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled, and recrystallized from acetone:hexane to yield 6,7-difluoromethylene-16-methyl-21-acetoxypregna-4,16-dien-11β-ol-3,20-dione.

To a stirred solution of 5 g. of 6,7-difluoromethylene-16 - methyl - 21 - acetoxypregna-4,16-dien-11β-ol-3,20-dione, in 350 ml. of methanol, is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water, and dried to yield 6,7-difluoromethylene-16α,17α-oxido-16β-methyl-21-acetoxypregn-4-en-11β-ol-3,20-dione which may be further purified by recrystallization from acetone: hexane.

To a solution of 1 g. of 6,7-difluoromethylene-16α,17α-oxido - 16β - methyl - 21-acetoxypregn-4-en-11β-ol-3,20-dione in 10 ml. of dioxane is added 0.5 ml. of a 50% w./v. solution of hydrogen bromide in acetic acid. After being allowed to stand for ten minutes at room temperature, the mixture is poured into water and extracted with ether. These ethereal extracts are dried over sodium sulfate and evaporated to dryness to yield 6,7-difluoromethylene - 16-methylene - 21-acetoxypregn - 4-en-11β,17α-diol-3,20-dione which may be further purified through recrystallization from acetone:hexane.

A mixture of 0.5 g. of 6,7-difluoromethylene-16-methylene-21-acetoxypregn-4-en - 11β,17α - diol-3,20-dione, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7 - difluoromethylene - 16 - methylene-21-acetoxypregna-1,4-diene-11β,17α-diol-3,20-dione which is further purified by recrystallization from acetone:hexane.

Alternatively, the $\Delta^{1,4}$-diene system is introduced through the action of selenium dioxide on the $\Delta^4$-ene, as described above in Example 2.

One gram of 6,7-difluoromethylene-16-methylene-21-acetoxypregna-1,4-diene - 11β,17α - diol-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6,7-difluoromethylene-16-methylenepregna - 1,4 - diene - 11α,17α,21-triol-3,20-dione which is collected by filtration and recrystallized from acetone:hexane.

If in place of 6,7 - difluoromethylenepregn - 4 - ene-11β,17α,21-triol-3,20-dione there is employed 6,7-difluoromethylene-9α-fluoropregn-4-ene - 11β,17α,21 - triol - 3,20-dione, there is obtained upon execution of the procedures recited in this example, 6,7-difluoromethylene-9α-fluoro-16-methylenepregna-1,4-diene-11β,17α,21-triol-3,20-dione.

Example 4

To 120 ml. of acetone containing 1 g. of 6,7-difluoromethylenepregn-4-ene - 11β,16α,17α,21 - tetrol-3,20-dione are added 30 drops of 70% perchloric acid. The mixture is allowed to stand one hour at room temperature, 30 drops of pyridine are added, and the solution is evaporated to dryness under reduced pressure. Thirty milliliters of water are added to the residue and this mixture is extracted several times with ethyl acetate. The combined extracts are washed to neutrality with water, dried over sodium sulfate, and evaporated to dryness. The residue upon trituration with methanol yields 6α,7α-difluoromethylene - 16α,17α - isopropylidenedioxypregn - 4 - ene-11β,21-diol-3,20-dione, M.P. 249–251° C., [α]$_D$=+164°, and the corresponding 6β,7β compound which are recrystallized from methanol.

A mixture of 1 g. of 6,7-difluoromethylene-16α,17α-isopropylidenedioxypregn-4-ene-11β,21-diol-3,20-dione, 4 ml. of pyridine, and 2 ml. of acetic anhydride is allowed to stand at room temperature for 15 hours. The mixture is then poured into ice water and the solid which forms is collected by filtration, washed with water, and dried to yield 6α,7α - difluoromethylene-16α,17α-isopropylidenedioxy-21-acetoxypregn-4-en-11β-ol-3,20-dione which may be further purified through recrystallization from acetone:hexane.

Similarly prepared in accordance herewith are 6α,7α-difluoromethylene- 16α,17α - isopropylidenedioxy-21-acetoxypregn - 4 - ene - 3,20 - dione, M.P. 219–220° C., [α]$_D$=+118°; 6α,7α-difluoromethylene - 16α,17α - isopropylidenedioxypregn-4-en-21-ol-3,20-dione, M.P. 180–181° C., [α]$_D$=+120°; and 6β-fluoro - 6α,7α - difluoromethylene-16α,17α - isopropylidenedioxy-21-acetoxypregn-4-en-11β-ol-3,20-dione, M.P. 245–247° C., [α]$_D$=−62°.

One gram of 6,7-difluoromethylene-16α,17α-isopropylidenedioxy-21-acetoxypregn-4-en-11β - ol - 3,20 - dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water, and extracted with ethyl acetate. The extracts are washed with water, dried over sodium sulfate, and evaporated to yield 6α,7α-difluoromethylene-16α,17α-isopropylidenedioxy-21-acetoxypregna - 4,9(11) - diene-3,20-dione, M.P. 155° C., as well as the corresponding 6β,7β-isomer which are further purified through recrystallization from acetone:hexane.

Twenty-eight grams of N-bromoacetamide are added over a one hour period with stirring, in the dark and at room temperature, to a mixture of 50 g. of 6,7-difluoromethylene - 16α,17α-isopropylidenedioxy-21-acetoxypregna-4,9(11)-diene-3,20-dione, 500 ml. of pure dioxane, and 8 ml. of 0.4 N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for ten hours, cooled, and almost all of the acetone is removed by distillation. Iced water is then added and the solid which forms collected by filtration, washed with water, and dried to yield 6,7-difluoromethylene - 9β,11β-oxido-16α,17α-isopropylidenedioxy-21-acetoxypregn-4-ene - 3,20 - dione which may be further purified through recrystallization from methylene chloride:benzene.

To a stirred solution of 1.8 g. of 6,7-difluoromethylene-9β,11β - oxido - 16α,17α-isopropylidenedioxy-21-acetoxypregn-4-ene-3,20-dione in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for six hours and then neutralized by the cautious addition of 5% aqueous sodium bicarbonate solution. The organic layer is separated, washed with water, dried over sodium sulfate, and concentrated until solid forms. The cooled mixture is then filtered and the solid dissolved in hot ethyl acetate. This solution is filtered hot and then cooled and the solid which forms collected by filtration, dried, and treated with acetone and perchloric acid as described in the initial paragraph of this example to yield 6,7-difluoromethylene - 9α-fluoro-16α,17α-isopropylidenedioxy-21-acetoxypregn-4-en-11β-ol-3,20-dione.

A mixture of 0.5 g. of 6,7 - difluoromethylene - 9α-fluoro - 16α,17α - isoproplidenedioxy - 21 - acetoxypregn-4 - en - 11β - ol - 3,20 - dione, 10 ml. of dioxane, and 0.35 g. of 2,3 - dichloro - 5,6 - dicyano - 1,4 - benzoquinone is refluxed for ten hours. The mixture is then cooled, filtered, and avaporated to dryness. The residue is dissolved in acetone and this solution is then filtered through 10 g. of aluminum and concentrated to yield 6,7-difluoromethylene - 9α - fluoro - 16α,17α - isopropylidenedioxy - 21 - acetoxypregna - 1,4 - diene - 11β - ol-3,20 - dione which is further purified by recrystallization from acetone:hexane.

Alternatively, the $\Delta^{1,4}$ - diene system is introduced through the use of selenium dioxide.

One gram of 6,7 - difluoromethylene - 9α - fluoro-16α,17α - isopropylidenedioxy - 21 - acetoxypregna - 1,4-dien - 11β - ol - 3,20 - dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6,7 - difluoromethylene - 9α-fluoro-16α,17α - isopropylidenedioxypregna - 1,4 - diene - 11β, 21 - diol - 3,20 - dione which is collected by filtration and recrystallized from acetone:hexane.

Alternatively, this compound is prepared in the following manner.

A mixture of 1 g. of 9α - fluoro - 16α,17α - isoproylidenedioxypregn - 4 - ene - 11β,21 - diol - 3,20 - dione, 4 ml. of pyridine, and 2 ml. of acetic anhydride is allowed to stand at room temperature for 15 hours. The mixture is then poured into ice water and the solid which forms is collected by filtration, washed with water, and dried to yield 9α - fluoro - 16α,17α - isopropylidenedioxy-21 - acetoxypregn - 4 - en - 11β - ol - 3,20 dione which may be further purified through recrystallization from acetone:hexane.

One gram of 9α - fluoro - 16α,17α - isopropylidenedioxy - 21 - acetoxypregn - 4 - en - 11β - ol - 3,20-dione and 2 g. of chloranil in 50 ml. of t-butanol are heated at reflux for eight hours. The cooled reaction mixture is filtered and the solid thus separated is washed with a large volume of ethyl acetate. The combined filtrate and washing are in turn washed with cold 10% aqueous sodium hydroxide until the washings are colorless, dried over sodium sulfate, and evaporated to dryness to yield 9α - fluoro - 16α,17α - isoproplidenedioxy - 21 - acetoxypregna - 4,6 - dien - 11β - ol - 3,20 - dione which may be further purified through clarification witth alumina and recrystallization from methylene chloride: ether.

By subjecting this compound to the action of sodium chlorodifluoroacetate according to the procedure described in Example 1, there is obtained 6β,7β - difluoromethylene - 9α - fluoro - 16α,17α - isopropylidenedioxy-21 - acetoxypregn - 4 - en - 11β - ol - 3,20 - dione and some 6α,7α - difluoromethylene - 9α - fluoro - 16α,17α-isopropylidenedioxy - 21 - acetoxypregn - 4 - en - 11β-ol - 3,20 - dione.

A mixture of 0.5 g. of 6,7 - difluoromethylene - 9α-fluoro - 16α,17α - isopropylidenedioxy - 21 - tetrahydropyran - 2 - yloxypregn - 4 - en - 11β - ol - 3,20-dione, 10 ml. of dioxane, and 0.35 g. of 2,3 - dichloro-5,6 - dicyano - 1,4 - benzoquinone is refluxed for ten hours. The mixture is then cooled, filtered, and evaporated to dryness. The residue is dissolved in acetone, and this solution is then filtered through 10 g. of alumina and concentrated to yield 6,7 - difluoromethylene - 9α - fluoro - 16α,17α - isoproplidenedioxy - 21-tetrahydropyran - 2 - yloxypregna - 1,4 - dien - 11β - ol-3,20 - dione which is further purified by recrystallization from acetone:hexane.

Similarly, the corresponding 21 - tetrahydrofuran-2-yloxy compound is so used.

Upon subjecting 16α,17α - isopropylidenedioxy - 21-tetrahydropyran - 2 - yloxypregna - 4,6 - diene - 3,20-dione to the difluoromethylene addition procedure set forth in Example 1 above, there is obtained 6α,7α-difluoromethylene - 16α,17α - isopropylidenedioxy - 21-tetrahydropyran - 2 - yloxypregn - 4 - ene - 3,20 - dione, M.P. 128–131° C., $[\alpha]_D = 68.9°$, which is hydrolyzed with acid to yield the corresponding free 21-hydroxy compound. In like manner, the corresponding 6β,7β compounds are so prepared.

Alternatively, the $\Delta^{1,4}$ - diene system may be introduced through the use of selenium dioxide.

One gram of 6,7 - difluoromethylene - 9α - fluoro-16α,17α - isopropylidenedioxy - 21 - acetoxypregna - 1,4-dien - 11β - ol - 3,20 - dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6,7 - difluoromethylene - 9α - fluoro-16α,17α - isopropylidenedioxypregna - 1,4 - diene - 11β, 21-diol-3,20-dione which is collected by filtration and recrystallized from acetone:hexane.

In another variation, the foregoing alternative reaction scheme, except for the dehydrogenation, is executed with the corresponding $\Delta^{1,4,6}$ - pregnatriene rather than the $\Delta^{4,6}$ - pregnadiene.

Other compounds prepared according to the foregoing methods include:

6,7-difluoromethylene-6β-methyl-9α-floro-16α,17α-isopropylidenedioxypregna-1,4-diene-11β,21-diol-3,20-dione;

6,7-difluoromethylene-6β-chloro-9α-fluoro-16α,17α-isopropylidenedioxypregna-1,4-diene-11β,21-diol-3,20-dione;

6,7-difluoromethylene-6β,9α-difluoro-16α,17α-isopropylidenedioxypregna-1,4-diene-11β,21-diol-3,20-dione;

6,7-difluoromethylene-6β-methyl-16α,17α-isopropylidenedioxypregna-1,4-diene-11β,21-diol-3,20-dione;

6,7-difluoromethylene-6β-fluoro-16α,17α-isopropylidenedioxypregna-1,4-diene-11β,21-diol-3,20-dione;

6,7-difluoromethylene-6β-chloro-16α,17α-isopropylidenedioxypregna-1,4-diene-11β,21-diol-3,20-dione; and 6,7-difluoromethylene-16α,17α-isopropylidenedioxypregna-1,4-diene-11β,21-diol-3,20-dione and the corresponding pregn-4-enes.

Example 5

To a solution of 1.6 g. of 6,7-difluoromethylene-16α,17α - isopropylidenedioxy-21-acetoxypregna-4,9(11)-diene-3,20-dione in 4 ml. of chloroform is added over a five minute period with continuous stirring, a solution of 0.3 g. of chlorine in 10 ml. of carbon tetrachloride. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate, and evaporated to dryness to yield 6α,7α-difluoromethylene-9α,11β - dichloro-16α,17α - isopropylidenedioxy - 21 - acetoxypregn - 4 - ene - 3,20 - dione, M.P. 210–218° C., $[\alpha]_D = +124°$, as well as the corresponding 6β,7β isomer, which are recrystallized from acetone:hexane.

A mixture of 0.5 g. of 6,7-difluoromethylene-9α,11β-dichloro - 16α,17α-isopropylidenedioxy-21-acetoxypregn-4-en-3,20-dione, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7 - difluoromethylene - 9α,11β-dichloro-16α,17α-isopropylidenedioxy - 21-acetoxypregna-1,4-diene-3,20-dione which is further purified by recrystallization from acetone:hexane.

One gram of 6,7 - difluoromethylene-9α,11β-dichloro-16α,17α - isopropylidenedioxy - 21 - acetoxypregna - 1,4-diene-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6,7 - difluoromethylene - 9α,11β-dichloro-16α,17α-isopropylidenedioxypregna - 1,4 - dien - 21-ol - 3,20-dione which is collected by filtration and recrystallized from acetone:hexane.

Alternatively, the foregoing compound is prepared by formation of the 3,20-bisethylenedioxy derivative of 9α,11β-dichloropregn-4-ene - 17α,21 - diol - 3,20-dione with ethylene glycol and p-toluenesulfonic acid, 21-acetylation, dehydration with thionyl chloride to yield 9α,11β-dichloro-21 - acetoxypregna - 4,16 - diene - 3,20-dione, oxidation to the corresponding 16α,17α-diol with osmium tetroxide, regeneration of the 3,20-diketo system through treatment with acetic acid, formation of 16α,17α-acetonide with acetone and perchloric acid and generation of either the $\Delta^{1,4,6}$-triene system or $\Delta^{4,6}$-diene system with chloranil to yield 9α,11β-dichloro-16α,17α-isopropylidenedioxy-21-acetoxypregna - 1,4,6 - triene-3,20-dione or 9α,11β - dichloro - 16α,17α - isopropylidenedioxy-21-acetoxypregna-4,6-diene-3,20-dione, respectively, depending upon the severity of the conditions of the dehydrogenation with chloranil. These compounds, either as the 21-acetates or after conversion to the 21-tetrahydropyranyl ethers, are then treated with sodium chlorodifluoroacetate as described in Example 1 to respectively yield, after conventional hydrolysis of the 21-protecting group 6β,7β - difluoromethylene - 9α,11β - dichloro 16α,17α-isopropylidene-dioxypregna-1,4-dien - 21-ol-3,20-dione, 6α,7α-difluoromethylene - 9α,11β-dichloro-16α17α-isopropylidenedioxypregna - 1,4 - dien - 21-ol-3,20-dione, and 6β,7β-difluoromethylene - 9α,11β-dichloro - 16α,17α-isopropylidenedioxypregn-4-en - 21 - ol - 3,20 - dione, and 6α,7α - difluoromethylene - 9α,11β - dichloro - 16α,17α-isopropylidene - dioxypregn - 4 - en-21-ol-3,20-dione. The converted to the former with 2,3 - dichloro - 5,6 - dicyanobenzoquinone or selenium dioxide.

Example 6

To a cooled solution (0° C.) of 3.4 g. of 6,7-difluoromethylenepregna - 1,4 - diene - 11β,17α,21-triol-3,20-dione in 20 ml. of 9:1 chloroform:pyridine is added in small portions, 1.4 g. of methanesulfonyl chloride. The mixture is allowed to stand for 14 hours at 0° C. and then washed with dilute hydrochloric acid, water, and sodium bicarbonate solution. The chloroform is removed by evaporation under reduced pressure and the residue is dissolved in 20 ml. of acetone and treated at room temperature under stirring with 4 g. of sodium iodide. Sodium thiosulfate solution is added to decolorize the mixture, followed by the addition of water. The solid which forms is collected by filtration and dried in vacuum to yield 6,7-difluoromethylene - 21 - iodopregna - 1,4 - diene-11β,17α-diol-3,20-dione. This material in 20 ml. of acetonitrile is treated dropwise with 1.4 g. of silver fluoride in 3 ml. of water. The mixture is allowed to stand at room temperature for 24 hours and then filtered. The filtrate is concentrated under vacuum and the residue is dried to yield 6,7-difluoromethylene-21-fluoropregna-1,4-diene-11β,17α-diol-3,20-dione which is recrystallized from methanol:acetone.

Similarly, the following compounds including both the alpha and beta isomers separable by chromatography are obtained according to the procedure of this example:

6,7 - difluoromethylene - 21 - fluoro - 16α-methylpregn-4-ene-11β,17α-diol-3,20-dione;
6,7 - difluoromethylene - 21 - fluoro - 16β-methylpregn-4-ene-11β,17α-diol-3,20-dione;
6,7 - difluoromethylene - 21 - fluoro - 16α-chloropregn-4-ene-11β,17α-diol-3,20-dione;
6,7 - difluoromethylene - 16α,21 - difluoropregn - 4-ene-11β,17α-diol-3,20-dione;
6,7 - difluoromethylene - 21 - fluoro - 16α-methylpregna-1,4-diene-11β,17α-diol-3,20-dione;
6,7 - difluoromethylene - 21 - fluoro - 16β-methylpregna-1,4-diene-11β,17α-diol-3,20-dione;
6,7 - difluoromethylene - 21 - fluoro - 16α - chloropregna-1,4-diene-11β,17α-diol-3,20-dione;
6,7-difluoromethylene-16α,21-difluoropregna-1,4-diene-11β,17α-diol-3,20-dione;
6,7-difluoromethylene-21-fluoropregn-4-ene-11β,17α-diol-3,20-dione;
6,7-difluoromethylene-9α,21-difluoropregn-4-ene-11β,17α-diol-3,20-dione;
6,7-difluoromethylene-9α,21-difluoropregna-1,4-diene-11β,17α-diol-3,20-dione;
6,7-difluoromethylene-9α,21-difluoro-16α-methylpregn-4-ene-11β,17α-diol-3,20-dione;
6,7-difluoromethylene-9α,21-difluoro-16β-methylpregn-4-ene-11β,17α-diol-3,20-dione;
6,7-difluoromethylene-9α,21-difluoro-16α-chloropregn-4-ene-11β,17α-diol-3,20-dione;
6,7-difluoromethylene-9α,16α,21-trifluoropregn-4-ene-11β,17α-diol-3,20-dione;
6,7-difluoromethylene-9α,21-difluoro-16α-methylpregna-1,4-diene-11β,17α-diol-3,20-dione;
6,7-difluoromethylene-9α,21-difluoro-16β-methylpregna-1,4-diene-11β,17α-diol-3,20-dione;
6,7-difluoromethylene-9α,21-difluoro-16α-chloropregna-1,4-diene-11β,17α-diol-3,20-dione;
6,7-difluoromethylene-9α,16α,21-trifluoropregna-1,4-diene-11β,17α-diol-3,20-dione;
6,7-difluoromethylene-16-methylene-21-fluoropregna-1,4-diene-11β,17α-diol-3,20-dione;
6,7-difluoromethylene-9α,21-difluoro-16-methylenepregna-1,4-diene-11β,17α-diol-3,20-dione;
6,7-difluoromethylene-16α,17α-isopropylidenedioxy-21-fluoropregna-1,4-dien-11β-ol-3,20-dione;
6,7-difluoromethylene-9α,21-difluoro-16α,17α-isopropylidenedioxypregna-1,4-dien-11β-ol-3,20-dione; and
6,7-difluoromethylene-9α,11β-dichloro-16α,17α-isopropylidenedioxy-21-fluoropregna-1,4-diene-3,20-dione.

The corresponding 21-phosphates of the above compounds are prepared as follows:

A mixture of 1 g. of 6,7-difluoromethylene-21-iodopregna-1,4-diene-11β,17α-diol-3,20-dione and 1.1 molar equivalents of silver monobasic phosphate in 60 ml. of acetonitrile is heated at reflux for two hours. The mixture is then filtered and evaporated to dryness to yield 6,7 - difluoromethylene - 21 - phosphatopregna-1,4-diene-11β,17α-diol-3,20-dione which may be recrystallized from methanol:ethyl acetate. This product, dissolved in methanol, may be tritrated with aqueous sodium hydroxide to yield the corresponding monosodium and disodium salts.

Likewise, by repeating the above procedure by which the 21-fluoro group is introduced, except for replacing silver fluoride with lithium chloride or silver chloride, the corresponding 21-chloro compounds are prepared.

Example 7

To a mixture of 700 mg. of 6,7-difluoromethylene-9α-fluoro - 16α - methylpregna - 1,4 - diene-11β,17α,21-triol-3,20-dione, 7 ml. of dry dimethylformamide, and 1.4 ml. of methyl orthovalerate are added 10 mg. of dry p-toluenesulfonic acid. The reaction mixture is heated at reflux for one hour and then poured into an aqueous solution of sodium bicarbonate. This mixture is extracted with benzene and evaporated to dryness to yield 6,7-difluoromethylene-9α-fluoro-16α-methyl-17α,21-(1 - methoxypent-1,1-ylidenedioxy)-pregna-1,4-dien - 11β - ol - 3,20-dione which is separated into its diastereoisomers through chromatography over alumina.

Likewise, by use of other compounds of the present invention possessing free 17α- and 21-hydroxy groups, the corresponding 17α,21-(1 - methoxypent-1,1-ylidenedioxy) derivatives are obtained. Alternatively, other ortho esters, such as methyl orthopropionate, ethyl orthoacetate, methyl orthoisobutyrate, methyl orthocaproate, and the like, may be employed in place of methyl orthovalerate to yield the corresponding ortho ester derivatives.

To a solution of 1 g. of 6,7-difluoromethylene-9α-fluoro-16α-methyl-17α,21 - (1 - methoxypent-1,1-ylidenedioxy)-pregna-1,4-dien-11β-ol - 3,20 - dione in 30 ml. of ethanol is added 0.5 ml. of 2 N hydrochloric acid. After heating the solution at 40° C. for about five minutes, the mixture is neutralized by the addition of sodium carbonate and is thereafter evaporated to dryness giving a residue which is recrystallized from ethanol giving 6,7-difluoromethylene-9α-fluoro - 16α - methyl - 17α - pentanoyloxypregna-1,4-diene-11β,21-diol-3,20-dione.

Similarly, the corresponding 6,7-methylene compounds, such as 6,7-methylene-9α-fluoro - 16α - methyl-17α-pentanoyloxypregna-1,4-diene-11β,21-diol-3,20-dione, are prepared.

Example 8

To a suspension of 1 g. of 17α-acetoxy-19-norpregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperatures for 15 minutes and allowed to stand at room temprature for 30 minutes. There is then added 0.8 ml. of pyridine, followed by water until solidification occurs. This solid is collected by filtration, washed with water, and air dried to yield 3-ethoxy-17α-acetoxy-19-norpregna-3,5(6)-diene-3,20-dione which is recrystallized from acetone:hexane.

To a solution of 1 g. of 3-ethoxy-17α-acetoxy-19-norpregna-3,5(6)-diene-3,20-dione in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate, and evaporated to dryness to yield 19-nor-17α-acetoxypregna - 4,6 - diene-3,20-dione which may be further purified through recrystallization from acetone:hexane.

To a gently refluxing solution of 1 g. of 17α-acetoxy-19-norpregna-4,6-diene-3,20-dione in 20 ml. of dimethyl diethylene glycol ether is added with stirring and in a dropwise fashion a 1:2 w./v. solution of sodium chlorodifluoroacetate in dimethyl diethyleneglycol ether. The addition is stopped after the introduction of further reagent fails to substantially change the U.V. spectrum. The mixture is then filtered and evaporated to dryness. The residue thus obtained is chromatographed on alumina with methylene chloride to yield 6α,7α-difluoromethylene-17α-acetoxy-19-norpregn-4-ene-3,20-dione and 6β,7β-difluoromethylene - 17α - acetoxy - 19 - norpregn-4-ene-3,20-dione.

Likewise, the following are thus prepared:

6β-fluoro-6α,7α-difluoromethylene-17α-acetoxypregn-4-en-3,20-dione, M.P. 220–222° C., [α]$_D$=—35°;
6α,7α-difluoromethylene-17α-acetoxypregn-4-ene-3,20-dione, M.P. 228–230° C., [α]$_D$=+61°;
6β-chloro-6α,7α-difluoromethylene-17α-acetoxypregn-4-ene-3,20-dione, M.P. 200–210° C., [α]$_D$=—27°;
6β-chloro-6α,7α-difluoromethylene-17α-acetoxypregna-1,4-diene-3,20-dione, M.P. 219–222° C., [α]$_D$=—116°, as well as the corresponding 6β,7β derivatives thereof.

In a similar fashion, the following compounds are obtained from the corresponding 3-keto-Δ$^{4,6}$-dienes according to the final procedure of this example or from the corresponding 3-keto-Δ$^4$-ene according to all the procedures of this example:

6,7-difluoromethylene-17α-acetoxypregna-1,4-diene-3,20-dione;
6,7-difluoromethylene-16α-methylpregn-4-en-17α-acetoxy-3,20-dione;
6,7-difluoromethylenepregn-4-ene-3,20-dione;
6,7-difluoromethylene-16α-methylpregn-4-ene-3,20-dione;
6,7-difluoromethylene-16α-methylpregna-1,4-diene-3,20-dione;
6-chloro-6,7-difluoromethylene-16α-methylpregn-4-ene-3,20-dione; and
6-chloro-6,7-difluoromethylene-16α-methylpregna-1,4-diene-3,20-dione.

Example 9

A mixture of 1.34 g. of 6,7-difluoromethylenepregn-4-ene-17α,21-diol-3,20-dione, 0.38 ml. of methanesulfonyl chloride, and 10 ml. of pyridine is allowed to stand at room temperature for 16 hours and is then poured into ice water and extracted with methylene chloride. The extracts are washed with 2 N hydrochloric acid, aqueous potassium bicarbonate solution, and saturated aqueous sodium chloride solution, dried over magnesium sulfate, and evaporated to dryness. This residue and 3.6 g. of sodium iodide is added to 150 ml. of acetone, boiled for 40 minutes, and evaporated to dryness under reduced pressure. The residue is extracted with methylene chloride. These extracts are washed with saturated aqueous sodium chloride solution, dried over magnesium sulfate, and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness to yield 6,7-difluoromethylenepregn - 4 - en-17α-ol-3,20-dione which may be further purified through recrystallization from acetone:hexane.

A mixture of 1 g. of 6,7-difluoromethylenepregn-4-en-17α-ol-3,20-dione, 1 g. of p-toluenesulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 6,7-difluoromethylene-17α-acetoxypregn-4-ene-3,20-dione which is recrystallized from acetone:ether.

Alternatively, this compound is prepared by subjecting 17α-acetoxypregna-4,6-diene-3,20-dione to the final procedure of Example 8.

Similar compounds prepared according to the foregoing methods include:

6,7-difluoromethylene-6β-chloro-17α-acetoxypregn-4-ene-3,20-dione;
6,7-difluoromethylene-6β-fluoro-17α-acetoxypregn-4-ene-3,20-dione; and
6,7-difluoromethylene-16α-methyl-17α-acetoxypregn-4-ene-3,20-dione.

By subjecting the above Δ$^4$-pregnenes to the action of 2,3-dichloro-5,6-dicyanobenzoquinone or selenium dioxide, the corresponding Δ$^{1,4}$-pregnadienes are obtained; e.g., 6,7-difluoromethylene-17α-acetoxypregna-1,4-diene-3,20-dione. Alternatively, the 6,7-substituent may be introduced in a pregna-1,4,6-triene rather than a pregna-4,6-diene.

Example 10

16α,17α-oxido-16β-methylpregna-4,6-diene-3,20-dione is subjected to the procedure of Example 1 to yield 6α,7α-difluoromethylene - 16α,17α - oxido - 16β - methylpregn-4-ene-3,20-dione and the corresponding 6β,7β-difluoromethylene - 16α,17α - oxido - 16β - methylenepregn-4-ene-3,20-dione.

To a solution of 1 g. of 6,7-difluoromethylene-16α,17α-oxido-16β-methylpregn-4-ene-3,20-dione in 10 ml. of dioxane is added 0.5 ml. of a 50% w./v. solution of hydrogen bromide in acetic acid. After being allowed to stand for ten minutes at room temperature, the mixture is poured into water and extracted with ether. These ethereal extracts are dried over sodium sulfate and evaporated to dryness to yield 6,7-difluoromethylene-16-methylenepregn-4-en-17α-ol-3,20-dione which may be further purified through recrystallization from acetone:hexane.

A mixture of 1 g. of 6,7-difluoromethylene-16-methylene-pregn-4-en-17α-ol-3,20-dione, 1 g. of p-toluene-sulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 6,7-difluoromethylene - 16 - methylene - 17α - acetoxypregn-4-ene-3,20-dione which is recrystallized from acetone:ether.

Alternatively, this compound may be prepared by subjecting 6,7-difluoromethylenepregn - 4 - ene - 17α,21-diol-3,20-dione to the procedure of Example 3 to yield 6,7-difluoromethylene - 16 - methylene - 21-acetoxypregn-4-en-17α-ol-3,20-dione which, after hydrolysis of the 21-acetoxy group, is treated according to the procedure of Example 9.

Example 11

A mixture of 5 g. of 6,7-difluoromethylene-9α-fluoro-16α - methyl - 17α,20;20,21 - bismethylenedioxypregn-4-en-11β-ol-3-one in 40 ml. of anhydrous thiophene-free benzene, 2 ml. of ethyl formate, and 1.5 g. of sodium hydride is stirred for eight hours under nitrogen. The solid which forms is collected by filtration, washed with benzene, and then hexane, and dried in vacuo. This material is then cautiously added in portions to excess ice-cold dilute hydrochloric acid with stirring. The solid which forms is collected by filtration, washed with water, and air dried. One gram of the product in 15 ml. of methanol is hydrogenated with 0.4 g. of prehydrogenated 10% palladium carbon catalyst at 25° C. atmospheric pressure until two moles of hydrogen are absorbed. The mixture is then filtered, the catalyst is washed with hot methanol, and the combined solutions are evaporated to dryness to yield 2α,16α-dimethyl - 6,7 - difluoromethylene-9α-fluoro-17α,20;20,21 - bismethylenedioxypregn-4-en-11β-ol-3-one which is recrystallized from acetone:hexane.

One gram of 2α,16α-dimethyl-6,7-difluoromethylene-9α-fluoro - 17α,20;20,21 - bismethylenedioxypregn-4-en-11β-ol-3-one in 20 ml. of 60% formic acid is heated at steam bath temperature for one hour. The mixture is cooled, diluted with water, and filtered. The solid thus collected is washed with water, dried, and recrystallized from acetone:hexane to yield 2α,16α-dimethyl-6,7-difluoromethylene - 9α - fluoropregn-4-ene-11β,17α,21-triol-3,20-dione.

Example 12

To a solution of 5 g. of 16α-methylpregn-4-ene-17α, 21-diol-3,11,20-trione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 16α-methyl - 17α,20;20,21 - bismethylendioxypregn - 4 - ene-3,11-dione which is recrystallized from methanol:ether.

A mixture of 1 g. of 16α-methyl-17α,20;20,21-bismethylenedioxypregn-4-ene-3,11-dione, 2 g. of chloranil, and 10 ml. of xylene is refluxed under an atmosphere of nitrogen for 16 hours. The mixture is cooled, washed with a cold 10% sodium hydroxide solution, and then with water, dried over sodium sulfate, and evaporated under reduced pressure. The residue is chromatographed on neutral alumina and further purified through recystallization from acetone:hexane to yield 16α-methyl-17α, 20;20,21-bismethylenedioxypregna-4,6-diene-3,11-dione.

A solution of 0.5 g. of 16α-methyl-17α,20;20,21-bismethylenedioxypregna-4,6-diene-3,11-dione in 5 ml. of dimethylsulfoxide is added to a solution of one equivalent of dimethylsulfoxonium methylide in dimethylsulfoxide, prepared in the manner of Corey et al., J.A.C.S. 87, 1353 (1965). The mixture is stirred under nitrogen and at room temperature for 20 hours and then at 50° C. for seven hours. Fifty milliliters of water are then added and the resulting mixture extracted four times with 50 ml. portions of ethyl acetate. The combined extracts are washed with water and saturated aqueous sodium chloride solution, dried over sodium sulfate, and evaporated to dryness. This residue is then chromatographed on silica, eluting with 1:9 ether:methylene chloride to yield 6β,7β-methylene-16α-methyl - 17α,20;20,21 - bismethylenedioxypregn-4-ene-3,11-dione and the corresponding 6α,7α-methylene-16α-methyl - 17α,20;20,21-bismethylenedioxypregn-4-ene-3,11-dione.

In like manner, the other Δ⁴,⁶-dienes of this invention are thus treated to furnish the corresponding 6α,7α- and 6β,7β-methylene derivatives thereof.

A solution of 1 g. of 6,7-methylene-16α-methyl-17α, 20;20,21-bismethylenedioxypregn-4-ene-3,11-dione in 50 ml. of tetrahydrofuran is added over a 30-minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered, and the solid thus collected is washed with hot ethyl acetate. The combined organic solutions are then evaporated to yield 6,7 - methylene-16α-methyl-17α,20;20,21-bismethylenedioxypregn-4-ene-3β,11β-diol which are further purified through recrystallization from acetone:hexane.

A mixture of 0.5 g. of 6,7-methylene-16α-methyl-17α-20;20,21 - bismethylenedioxypregn-4-ene-3β,11β-diol, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7 - methylene-16α-methyl-17α,20;20,21-bismethylenedioxypregna-1,4-dien-11β-ol-3-one which is further purified by recrystallization from acetone:hexane.

A suspension of 1 g. of 6,7-methylene-16α-methyl-17α, 20;20,21 - bismethylenedioxypregna-1,4-dien-11β-ol-3-one in 10 ml. of 48% aqueous hydrofluoric acid is stirred at 0° C. for 90 minutes. At the end of this time, the reaction mixture is neutralized with 5% aqueous potassium bicarbonate and extracted with ethyl acetate. These extracts are evaporated to dryness under reduced pressure and chromatographed on silica gel with 2:1 hexane:ethyl acetate to yield 6,7-methylene-16α-methylpregna-1,4-diene-11β,17α,21-triol-3,20-dione which may be further purified through recrystallization from isopropanol.

Similarly prepared are 6β,7β-methylene-17α,20;20, 21-bismethylenedioxypregn-4-en-11β-ol-3-one, M.P. 233.5–235° C., [α]_D=−160°; 6β,7β-methylene-16α-methyl-17α, 20;20,21-bismethylenedioxypregn-4-en-11β-ol-3-one, M.P. 228–230° C., [α]_D=−132°; 6β,7β-methylenepregn-4-ene-11β,17α,21-triol - 3,20 - dione, M.P. 253–256° C., [α]_D=−27°; 6β,7β - methylene - 16α - methylpregn-4-ene - 11β,17α,21- triol-3,20-dione, M.P. 230–240° C., [α]_D=−60°; as well as the corresponding 6α,7α compounds, each from the requisite starting compound.

Other compounds obtained according to the foregoing procedure include:

6,7-methylene-9α-fluoro-16α-methylpregna-1,4-diene-11β,17α,21-triol-3,20-dione;
6,7-methylene19α-fluoropregna-1,4-diene-11β,17α-21-triol-3,20-dione;
6,7-methylene-6β,9α-difluoro-16α-methylpregna-1,4-diene-11β,17α,21-triol-3,20-dione;
6,7-methylene-16α,-methylpregna-1,4-diene-11β,17α, 21-triol-3,20-dione;
6,7-methylene-16α-methylpregna-1,4-diene-11β,17α, 21-triol-3,20-dione;
6,7-methylene-6β,9α-difluoropregna-1,4-diene-11β, 17α,21-triol-3,20-dione;
6,7-methylene-6β-fluoropregna-1,4-diene-11β, 17α,21-triol-3,20-dione;
6,7-methylene-6β-fluoro-16α-methylpregna-1,4-diene-11β,17α,21-triol-3,20-dione;

6,7-methylene-6β-chloropregna-1,4-diene-11β,17α,21-triol-3,20-dione;

6,7-methylene-6β-chloro-9α-fluoropregna-1,4-diene-11β,17α,21-triol-3,20-dione;

6,7-methylene-6β-chloro-9α-fluoro-16α-methylpregna-1,4-diene-11β,17α,21-triol-3,20-dione; and 6,7-methylene-6β-chloro-16α-methylpregna-1,4-diene-11β,17α,21-triol-3,20-dione.

According to the procedure set forth in the third paragraph (above) of this example, there is obtained from 17α,20;20,21-bismethylenedioxypregna-4,6-dien-3-one, 6β,7β-methylene - 17α,20;20,21 - bismethylenedioxypregn-4-en-3-one, as well as the corresponding 6α,7α-isomer. These compounds are hydrolyzed to 6,7-methylenepregn-4-ene-17α,21-diol-3,20-dione which are incubated according to processes known per se to furnish 6,7-methylenepregn-4-ene-11β,17α,21-triol - 3,20 - dione. Similarly, the corresponding 16α-methyl compound is prepared as well as the other 6,7-methylene-11β-hydroxy compounds contemplated herein.

Example 13

A refluxing solution of 1 g. of 17α,20;20,21-bismethylenedioxypregna-4,6-dien-3-one in 15 ml. of dimethyl diethylene glycol ether, under nitrogen, is treated in a dropwise fashion with a 50% w./v. solution of sodium trichloroacetate in dimethyl diethylene glycol. When there is no change in the U.V. spectrum upon the addition of five equivalents of reagent, the refluxing is discontinued. The reaction mixture is filtered and chromatographed on alumina with 3:1 hexane-methylene chloride to yield 6α,7α-dichloromethylene - 17α,20;20,21 - bismethylenedioxypregn-4-en-3-one and the corresponding 6β,7β-dichloromethylene - 17α,20;20,21 - bismethylenedioxypregn-4-en-3-one.

In like manner, the other Δ$^{4,6}$-dienes of this invention are thus treated to furnish the corresponding 6α,7α- and 6β,7β-dichloromethylene derivatives thereof. For example, 6α,7α - dichloromethylene-17α-acetoxypregn-4-ene - 3,20-dione, M.P. 188° C., [α]$_D$=+81°, as well as the corresponding 6β,7β compound are thus prepared.

A suspension of 1 g. of 6,7-dichloromethylene-17α,20;20,21-bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with the ethyl acetate. These extracts are evaporated to dryness under reduced pressure and chromatographed on silica gel with 2:1 hexane:ethyl acetate to yield 6,7-dichloromethylenepregn-4-ene-17α,21-diol-3,20-dione which may be further purified through recrystallization from isopropanol.

Example 14

A solution of 1 g. of 6α,7α-dichloromethylene-17α,20;20,21-bismethylenedioxypregn-4-one in anhydrous ethyl ether is stirred under nitrogen for 48 with a molar excess of lithium aluminum hydride. At the end of this time, the mixture is cautiously treated with 2 ml. of ethyl acetate and 1 ml. of water and filtered. The solid is washed well with hot ethyl acetate. The combined organic solutions are then dried over sodium sulfate and evaporated to dryness. This residue, in sufficient dioxane, is mixed with 1.1 molar equivalents of 2,3-dichloro-5,6-dicyano-1,4-benzoquinone and allowed to stand at 25° C. for three hours. After filtration, the solution is evaporated to dryness and the residue dissolved in acetone and filtered through alumina to yield, after evaporation, 6α,7α-methylene- 17α,20;20,21-bismethylenedioxypregn-4-en-3-one.

Similarly, by starting with 6β, 7β-dichloromethylene-17α,20;20,21-bismethylenedioxypregn-4-en-3-one there is obtained 6β,7β - methylene - 17α,20;20,21-bismethylenedioxypregn-4-en-one.

Likewise, the other 6,7-dichloromethylene compounds hereof are thus treated to furnish the corresponding 6,7-methylene derivatives thereof.

A suspension of 1 g. of 6,7-methylene-17α,20;20,21-bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6,7-methylenepregn-4-en-17α,21-diol-3,20-dione which may be further purified through recrystallization from isopropanol.

A mixture of 1.34 g. of 6,7-methylenepregn-4-ene-17α,21-diol-,2-dione, 0.3 ml. of methanesulfonyl chloride and 10 ml. of pyridine is allowed to stand at room temperature for 16 hours and is then poured into the water and extracted with methylene chloride. The extracts are washed with 2 N hydrochloric acid, aqueous potassium bicarbonate solution, and saturated aqueous sodium chloride solution, dried over magnesium sulfate, and evaporated to dryness. This residue and 3.6 g. of sodium iodide is added to 159 ml. of acetone, boiled for 40 minutes, and evaporated to dryness under reduced pressure. The residue is extracted with methylene chloride. These extracts are washed with saturated aqueous sodium chloride solution, dried over magnesium sulfate, and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness of yield 6,7-methylenepregn-4-en-17α-ol-3,20-dione which may be further purified through recrystallization from acetone:hexane.

A mixture of 1 g. of 6,7-methylenepregn-4-en-17α-ol-3,20-dione, 1 g. of p-toluenesulfonic acid monohydrate, 50 ml. of acetic acid, and 25 ml. of acetic anhydride is allowed to stand at room temperature for 24 hours and then poured into water and stirred. This mixture is then extracted with methylene chloride and these extracts are dried and evaporated to yield 6,7-methylene-17α-acetoxypregn-4-ene-3,20-dione which is recrystallized from acetone:ether.

Alternatively, this compound may be obtained by treating 17α-acetoxypregna-4,6-diene-3,20-dione with dimethylsulfoxonium methylide as described in Example 12.

The following compounds are similarly obtained:
6,7-methylene-6β-fluoro-17α-acetoxypregn-4-ene-3,20-dione;
6,7-methylene-6β-chloro-17α-acetoxypregn-4-ene-3,20-dione;
6,7-methylene-16α-methyl-17α-acetoxypregn-4-ene-3,20-dione;
6,7-methylene-6β-chloro-16α-methyl-17α-acetoxypregn-4-ene-3,20-dione;
6,7-methylene-6β-floro-16α-methyl-17α-acetoxypregn-4-ene-3,20-dione;
6,7-methylene-17α-acetoxypregna-1,4-diene-3,20-dione; and
6-chloro-6,7-methylene-17α-acetoxypregna-1,4-diene-3,20-dione;

Example 15

To a solution of 5 g. of 6α,9α-difluoropregn-4-ene-11β,16α,17α,21-tetrol-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 6α,9α - difluoro - 17α,20;20,21-bismethylenedioxypregn-4- ene - 11β,16α-diol - 3 - one which is recrystallized from methanol:ether.

A mixture of 1 g. of 6α,9α-difluoro-17α,20;20,21-bismethylenedioxypregn-4-ene-11β,16α-diol-3-one, 4 ml. of pyridine, and 2 ml. of acetic anhydride is allowed to stand at room temperature for 15 hours. The mixture is then poured into ice water and the solid which forms is collected by filtration, washed with water, and dried to yield 6α,9α - difluoro - 16α - acetoxy - 17α,20;20,21 - bismethylenedioxypregn-4-en-11β-ol-3-one which may be further purified through recrystallization from acetone:hexane.

One gram of 6α,9α-difluoro-16α-acetoxy-17α,20;20,21-bismethylenedioxypregn-4-en-11β-ol-3-one and 2 g. of chloranil in 50 ml. of t-butanol are heated at reflux for eight hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate, and evaporated to dryness to yield 6,9α-difluoro-16α-acetoxy - 17α,20;20,21 - bismethylenedioxypregna - 4,6-dien-11β-ol-3-one which may be further purified through clarification with alumina and recrystallization from methylene chloride:ether.

By subjecting 6,9α-difluoro-16α-acetoxy-17α,20;20,21-bismethylenedioxypregna-4,6-dien-11β-ol-3-one to the action of dimethylsulfonium methylide as described in Example 12, utilizing, however, two equivalents of reagent, there is obtained 6β,7β-methylene-6β,9α-difluoro-16α-acetoxy - 17α,20;20,21 - bismethylenedioxypregn - 4 - en-11β-ol-3-one and some of the corresponding 6α,7α-methylene compound.

A suspension of 1 g. of 6,7-methylene-6β,9α-difluoro-16α - acetoxy - 17α,20;20,21 - bismethylenedioxypregn-4-en-11β-ol-3-one in 60 ml. of methanol is treated with a solution of 1 g. of potassium carbonate in 6 ml. of water. The mixture is heated at reflux for one hour, cooled in ice, and diluted with water. The solid which forms is collected by filtration, washed with water, and dried to yield 6,7 - methylene - 6β,9α - difluoro - 17α,20;20,21-bismethylenedioxypregn-4-ene-11β,16α-diol-3 - one which is recrystallized from acetone:hexane.

A mixture of 0.5 g. of 6,7-methylene-6β,9α-difluoro-17α,20;20,21 - bismethylenedioxypregn - 4 - ene - 11β,16α-diol-3-one, 10 ml. of dioxane, and 0.35 g. of 2,3-dichloro-5,6-dicyano-1,4-benzoquinone is refluxed for ten hours. The mixture is then cooled, filtered, and evaporated to dryness. The residue is dissolved in acetone and this solution is then filtered through 10 g. of alumina and concentrated to yield 6,7-methylene-6β,9α-difluoro-17α,20;20,21-bismethylenedioxpregna - 1,4 - diene - 11β,16α - diol - 3-one which is further purified by recrystallization from acetone:hexane.

Alternatively, selenium dioxide may be employed to introduce the Δ$^{1,4}$-diene system according to the procedure described above.

A suspension of 1 g. of 6,7-methylene-6β,9α-difluoro-17α,20;20,21 - bismethylenedioxypregna - 1,4 - diene - 11β,16α-diol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6,7-methylene-6β,9α - difluoropregna - 1,4 - diene - 11β,16α,17α,21-tetrol-3,20-dione which may be further purified through recrystallization from isopropanol.

To 120 ml. of acetone containing 1 g. of 6,7-methylene-6β,9α - difluoropregna - 1,4 - diene - 11β,16α,17α,21-tetrol-3,20-dione are added 30 drops of 70% perchloric acid. The mixture is allowed to stand one hour at room temperature, 30 drops of pyridine are added, and the solution is evaporated to dryness under reduced pressure. Thirty milliliters of water are added to the residue and this mixture is extracted several times with ethyl acetate. The combined extracts are washed to neutrality with water, dried over sodium sulfate, and evaporated to dryness. The residue upon trituration with methanol yields 6,7 - methylene - 6β,9α - difluoro - 16α,17α - isopropylidenedioxypregna-1,4-diene-11β,21-diol-3,20 - dione which is recrystallized from methanol.

The following compounds are similarly prepared:

6,7-methylene-9α-fluoro-16α,17α-isopropylidenedioxypregna-1,4-diene-11β,21-diol-3,20-dione;
6,7-methylene-6β-fluoro-16α,17α-isopropylidenedioxypregna-1,4-diene-11β,21-diol-3,20-dione;
6,7-methylene-6β-chloro-16α,17α-isopropylidenedioxypregna-1,4-diene-11β,21-diol-3,20-dione;
6,7-methylene-6β-chloro-9α-fluoro-16α,17α-isopropylidenedioxypregna-1,4-diene-11β,21-diol-3,20-dione; and
6,7-methylene-16α,17α-isopropylidenedioxypregna-1,4-diene-11β,21-diol-3,20-dione.

Example 16

A mixture of 1 g. of 6,7-difluoromethylene-16α-methylpregna-1,4-diene-11β,17α,21-triol-3,20-dione in 15 ml. of dry chloroform, which has been previously washed with concentrated sulfuric acid, and 15 ml. of a 0.7 N solution of hydrogen chloride in benzyl alcohol is allowed to stand for five days with occasional shaking. At the end of this period, the solvents are removed by steam distillation and the residue extracted with ether. The ethereal extracts are washed well with water, dried, and evaporated.

A solution of 1 g. of this material in 20 ml. of ethanol, previously distilled over Raney nickel, is hydrogenated with 0.25 g. of a 10% palladium-on-charcoal catalyst for 24 hours. The catalyst is then removed by filtration through Celite diatomaceous earth and the filtrate evaporated to dryness to yield 6,7-difluoromethylene-16α-methylpregna - 1,4 - diene - 11β,21 - diol - 3,20 - dione which may be further purified by recrystallization from acetone:hexane.

In a similar fashion, 6,7-difluoromethylene-9α-fluoro-16α - methylpregna - 1,4 - diene-11β,21-diol-3,20-dione, 6,7 - difluoromethylene - 9α,11β - dichloro-16α-methylpregna-1,4-dien-21-ol-3,20-dione, 6,7 - difluoromethylene-9α - chloro - 16α - methylpregna - 1,4-diene-11β,21-diol-3,20 - dione, 6,7 - methylene - 16α - methylpregna - 1,4-diene - 11β,21 - diol - 3,20 - dione, and 6,7 - methylene-9α - fluoro - 16α - methylpregna - 1,4 - diene - 11β,21-diol - 3,20 - dione are obtained from the corresponding 17α-hydroxy derivatives.

The foregoing compounds may be treated with acetic anhydride in pyridine in the manner previously described to yield the corresponding 21-acetates.

Alternatively, the 17β-desoxy compounds can be prepared by treating the corresponding 3-keto-Δ$^4$-17-hydroxy derivative as described above to give the 17β-desoxy intermediate followed by introduction of the C-6,7-unsaturation and 6,7-methylene or -halomethylene group as described above.

Example 17

The procedure set forth in the third paragraph of Example 1 is repeated with the exception of using the appropriate quantity of sodium dichlorofluoroacetate in lieu of sodium chlorodifluoroacetate to yield the corresponding 6α,7α - chlorofluoromethylene - 16α - methyl-17α,20;20,21 - bismethylenedioxypregn - 4 - en-11β-ol-3-one and the corresponding 6β,7β-chlorofluoromethylene isomer.

Similarly, the other Δ$^{4,6}$-dienes of this invention are thus treated to furnish the corresponding 6,7-chlorofluoromethylene compounds.

Example 18

To a solution of 10 g. of 16α-methyl-17α,20;20,21-bismethylenedioxypregna - 4,6-dien - 11β - ol - 3 - one in 50 ml. of benzene is added 1.2 molar equivalents of trimethyltrifluoromethyl tin and 1.2 molar equivalents of sodium iodide in 10 ml. of monoglyme. The reaction mixture is refluxed for two hours after which time it is cooled, washed with water, and evaporated to give 6,7 - difluoromethylene - 16α - methyl - 17α,20;20,21-bismethylenedioxypregn-4-en-11β-ol-3-one.

Similarly, the other 6,7-difluoromethylene compounds hereof are prepared.

Example 19

To a solution of 10 g. of 16α-methyl-17α,20;20,21-bismethylenedioxypregna - 4,6 - dien - 11β - ol - 3 - one in 50 ml. of benzene is added 1.2 molar equivalents of phenyldichlorobromomethyl mercury. The reaction mixture is refluxed for four hours after which time it is cooled and evaporated to give 6,7-dichloromethylene-16α-methyl - 17β,20;20,21 - bismethylenedioxypregn - 4 - en-11β-ol-3-one.

Similarly, the other 6,7-dichloromethylene compounds hereof are prepared.

Example 20

To a stirred, refluxing solution of 1 g. of 16α-methyl-21-acetoxypregna-4,6-diene-11β-ol-3,20-dione in 15 ml. of dimethyl triethylene glycol ether is added in a dropwise fashion a 50% w./v. solution of sodium chlorodifluoroacetate in dimethyl triethylene glycol ether. When the further addition of reagent fails to effect a change in the U.V. spectrum, the addition is stopped. The mixture is cooled and filtered. The filtrate is evaporated to dryness and the residue is chromatographed on alumina with methylene chloride to yield 6α,7α-difluoromethylene-11β - chlorodifluoroacetoxy - 16α - methyl - 21 - acetoxypregn-4-ene-3,20-dione, M.P. 161–163° C., [α]$_D$=+159°, and 6β,7β - difluoromethylene - 11β - chlorodifluoroacetoxy - 16α - methyl - 21 - acetoxypregn - 4 - ene - 3,20-dione, M.P. 201–203° C., [α]$_D$=±0°. Hydrolysis is next performed by refluxing these compounds in methanolic sodium methoxide to respectively yield 6α,7α-difluoromethylene - 16α - methylpregn - 4 - ene - 11β,21 - diol-3,20-dione, M.P. 201–203° C., [α]$_D$=+175°, and 6β,7β-difluoromethylene - 16α - methylpregn - 4 - ene - 11β,21-diol-3,20-dione, M.P. 230–233° C., [α]$_D$=−71°.

What is claimed is:

1. Compounds of the formula:

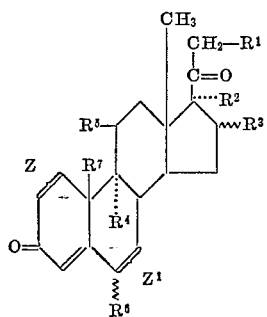

wherein

R$^1$ is hydroxy, fluoro, chloro, phosphato, tetrahydropyran-2-yloxy, tetrahydrofuran-2-yloxy, or a hydrocarbon carboxylic acyloxy group of less than 12 carbon atoms;

R$^2$ is hydrogen, hydroxy, a hydrocarbon carboxylic acyloxy group of less than 12 carbon atoms or, when taken together with R$^1$, one of groups

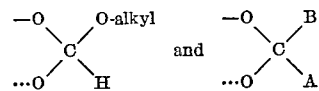

in which A is a hydrogen or alkyl of up to 8 carbon atoms and B is hydrogen, or alkyl or aryl of up to 8 carbon atoms;

R$^3$ is hydrogen, methylene, α-methyl, β-methyl, α-chloro, α - fluoro, α - hydroxy, a α - hydrocarbon carboxylic acyloxy group of less than 12 carbon atoms or, when taken together with R$^2$, the group

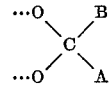

in which A is hydrogen or alkyl of up to 8 carbon atoms and B is hydrogen, or alkyl or aryl of up to 8 carbon atoms;

R$^4$ is hydrogen, chloro, or fluoro;

R$^5$ is hydrogen, hydroxy, keto, or chloro, R$^4$ and R$^5$ being the same when R$^5$ is hydrogen or chloro;

R$^6$ is hydrogen, methyl, chloro, or fluoro;

R$^7$ is hydrogen or methyl;

Z is a carbon-carbon single bond or a carbon-carbon double bond, Z being a single bond when R$^7$ is hydrogen; and Z$^1$ is the group

in which each of X and Y is hydrogen, chloro, or fluoro;

2. Compounds according to claim 1 wherein R$^1$ is hydroxy or fluoro;

R$^2$ is hydrogen, hydroxy, or a hydrocarbon carboxylic acyloxy group of less than 12 carbon atoms;

R$^3$ is hydrogen, α-methyl, α-hydroxy, or, when taken together with R$^2$, the group

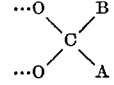

in which A is hydrogen or alkyl of up to 8 carbon atoms and B is hydrogen, or alkyl or aryl of up to 8 carbon atoms;

R$^4$ is hydrogen, chloro, or fluoro;

R$^5$ is hydroxy or chloro, R$^4$ and R$^5$ being the same when R$^5$ is chloro;

R$^6$ is hydrogen, methyl, chloro, or fluoro;

R$^7$ is methyl, Z is a carbon-carbon single bond or a carbon-carbon double bond; and Z$^1$ is the group

in which X is hydrogen, chloro, or fluoro and Y is chloro or fluoro.

3. A compound according to claim 2 wherein R$^1$ is hydroxy, R$^2$ is hydrogen, R$^3$ is α-methyl, R$^4$ is hydrogen, R$^5$ is hydroxy, R$^6$ is hydrogen, Z is a carbon-carbon double bond, and Z$^1$ is the group

4. Compounds according to claim 2 wherein R$^1$ is hydroxy, R$^2$ is hydrogen, R$^3$ is α-methyl, R$^4$ is chloro, R$^5$ is chloro, R$^6$ is hydrogen, Z is a carbon-carbon double bond, and Z$^1$ is the group

5. Compounds according to claim 2 wherein R$^1$ is hydroxy, R$^2$ is hydrogen, R$^3$ is α-methyl, R$^4$ is fluoro, R$^5$ is hydroxy, R$^6$ is hydrogen, Z is a carbon-carbon double bond and Z$^1$ is the group

6. Compounds according to claim 2 wherein R$^1$ is hydroxy, R$^2$ is hydrogen, R$^3$ is α-methyl, R$^4$ is chloro, R$^5$ is hydroxy, $R^6$ is hydrogen, Z is a carbon-carbon double bond, and $Z^1$ is the group

7. A compound according to claim 2 wherein $R^1$ is hydroxy, $R^2$ is hydroxy, $R^3$ is α-methyl, $R^4$ is hydrogen, $R^5$ is hydroxy, $R^6$ is hydrogen, Z is a carbon-carbon double bond and $Z^1$ is the group

8. Compounds according to claim 2 wherein $R^1$ is hydroxy, $R^2$ is hydroxy, $R^3$ is α-methyl, $R^4$ is chloro, $R^5$ is chloro, $R^6$ is hydrogen, Z is a carbon-carbon double bond and $Z^1$ is the group

9. Compounds according to claim 2 wherein $R^1$ is hydroxy, $R^2$ is hydroxy, $R^3$ is α-methyl, $R^4$ is fluoro, $R^5$ is hydroxy, $R^6$ is hydrogen, Z is a carbon-carbon double bond, and $Z^1$ is the group

10. Compounds according to claim 2 wherein $R^1$ is hydroxy, $R^2$ is hydroxy, $R^3$ is α-methyl, $R^4$ is chloro, $R^5$ is hydroxy, $R^6$ is hydrogen, Z is a carbon-carbon double bond, and $Z^1$ is the group

11. Compounds according to claim 2 wherein $R^1$ is hydroxy, $R^2$ and $R^3$ taken together is isopropylidenedioxy, $R^4$ is fluoro, $R^5$ is hydroxy, $R^6$ is hydrogen, Z is a carbon-carbon double bond, and $Z^1$ is the group

12. Compounds according to claim 2 wherein $R^1$ is hydroxy, $R^2$ is pentanoyloxy, $R^3$ is α-methyl, $R^4$ is fluoro, $R^5$ is hydroxy, $R^6$ is hydrogen, Z is a carbon-carbon double bond, and $Z^1$ is the group

13. Compounds of the formula:

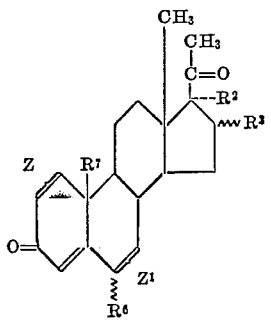

wherein
$R^2$ is hydrogen, hydroxy or a hydrocarbon carboxylic acyloxy group of less than 12 carbon atoms;
$R^3$ is hydrogen, α-methyl, or, when taken together with $R^2$, the group

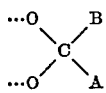

in which A is hydrogen or alkyl of up to 8 carbon atoms and B is hydrogen, or alkyl or aryl of up to 8 carbon atoms;
$R^6$ is methyl, chloro or fluoro;
$R^7$ is hydrogen or methyl;
Z is a carbon-carbon single bond or a carbon-carbon double bond, Z being a single bond when $R^7$ is hydrogen; and
$Z^1$ is the group

in which each of X and Y is hydrogen, chloro or fluoro.

14. A compound according to claim 13 wherein $R^2$ is hydrogen, $R^3$ is α-methyl, $R^7$ is methyl, Z is a carbon-carbon single bond, and $Z^1$ is the group

15. A compound according to claim 13 wherein $R^2$ is acetoxy, $R^3$ is hydrogen, $R^7$ is methyl, Z is a carbon-carbon single bond, and $Z^1$ is the group

16. A compound according to claim 13 wherein $R^2$ is hydrogen, $R^3$ is α-methyl, $R^7$ is methyl, Z is a carbon-carbon double bond, and $Z^1$ is the group

17. A compound according to claim 13 wherein $R^2$ is acetoxy, $R^3$ is hydrogen, $R^7$ is methyl, Z is a carbon-carbon double bond, and $Z^1$ is the group

18. A compound according to claim 13 wherein $R^2$ is hydrogen, $R^3$ is α-methyl, $R^6$ is β-chloro, $R^7$ is methyl, Z is a carbon-carbon single bond, and $Z^1$ is the group

19. A compound according to claim 13 wherein $R^2$ is acetoxy, $R^3$ is hydrogen, $R^6$ is β-chloro, $R^7$ is methyl, Z is a carbon-carbon single bond, and $Z^1$ is the group

20. A compound according to claim 13 wherein $R^2$ is hydrogen, $R^3$ is α-methyl, $R^6$ is β-chloro, $R^7$ is methyl, Z is a carbon-carbon double bond, and $Z^1$ is the group

21. A compound according to claim 13 wherein $R^2$ is acetoxy, $R^3$ is hydrogen, $R^6$ is β-chloro, $R^7$ is methyl, Z is a carbon-carbon double bond, and $Z^1$ is the group

22. Compounds according to claim 1 wherein $R^1$ is hydroxy or fluoro;
$R^2$ is hydrogen, hydroxy, or a hydrocarbon carboxylic acyloxy group of less than 12 carbon atoms;
$R^3$ is hydrogen, α-methyl, α-hydroxy, or, when taken together with $R^2$, the group

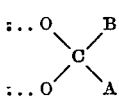

in which A is hydrogen or alkyl of up to 8 carbon atoms and B is hydrogen, or alkyl or aryl of up to 8 carbon atoms;
$R^4$ is hydrogen, chloro, or fluoro;

$R^5$ is hydroxy or chloro, $R^4$ and $R^5$ being the same when $R^5$ is chloro;
$R^6$ is hydrogen, methyl, chloro, or fluoro;
$R^7$ is methyl;
Z is a carbon-carbon single bond or a carbon-carbon double bond; and
$Z^1$ is the group

23. Compounds according to claim 22 wherein $R^1$ is hydroxy, $R^2$ is hydrogen, $R^3$ is α-methyl, $R^4$ is hydrogen, $R^5$ is hydroxy, $R^6$ is hydrogen, and Z is a carbon-carbon double bond.

24. Compounds according to claim 22 wherein $R^1$ is hydroxy, $R^2$ is hydrogen, $R^3$ is α-methyl, $R^4$ is fluoro, $R^5$ is hydroxy, $R^6$ is hydrogen, and Z is a carbon-carbon double bond.

25. Compounds according to claim 22 wherein $R^1$ is hydroxy, $R^2$ is hydroxy, $R^3$ is α-methyl, $R^4$ is hydrogen, $R^5$ is hydroxy, $R^6$ is hydrogen, and Z is a carbon-carbon double bond.

26. Compounds according to claim 22 wherein $R^1$ is hydroxy, $R^2$ is hydroxy, $R^3$ is α-methyl, $R^4$ is fluoro, $R^5$ is hydroxy, $R^6$ is hydrogen, and Z is a carbon-carbon double bond.

27. Compounds according to claim 22 wherein $R^1$ is hydroxy, $R^2$ and $R^3$ taken together is isopropylidenedioxy, $R^4$ is hydrogen, $R^5$ is hydroxy, $R^6$ is hydrogen, and Z is a carbon-carbon double bond.

28. Compounds according to claim 22 wherein $R^1$ is hydroxy, $R^2$ and $R^3$ taken together is isopropylidenedioxy, $R^4$ is fluoro, $R^5$ is hydroxy, $R^6$ is hydrogen, and Z is a carbon-carbon double bond.

29. Compounds according to claim 22 wherein $R^1$ is hydroxy, $R^2$ is pentanoyloxy, $R^3$ is α-methyl, $R^4$ is fluoro, $R^5$ is hydroxy, $R^6$ is hydrogen, and Z is a carbon-carbon double bond.

30. Compounds according to claim 13 wherein
$R^2$ is hydrogen, hydroxy, or a hydrocarbon carboxylic acyloxy group of less than 12 carbon atoms;
$R^3$ is hydrogen or α-methyl;
$R^6$ is methyl, chloro or fluoro;
$R^7$ is hydrogen or methyl;
Z is a carbon-carbon single bond or a carbon-carbon double bond, Z being a single bond when $R^7$ is hydrogen; and
$Z^1$ is the group

31. Compounds according to claim 30 wherein $R^2$ is acetoxy, $R^3$ is hydrogen, $R^7$ is methyl, and Z is a carbon-carbon single bond.

32. Compounds according to claim 30 wherein $R^2$ is acetoxy, $R^3$ is hydrogen, $R^6$ is chloro, $R^7$ is methyl, and Z is a carbon-carbon single bond.

33. Compounds according to claim 30 wherein $R^2$ is acetoxy, $R^3$ is hydrogen, $R^7$ is methyl, and Z is a carbon-carbon double bond.

34. Compounds according to claim 30 wherein $R^2$ is acetoxy, $R^3$ is hydrogen, $R^6$ is chloro, $R^7$ is methyl, and Z is a carbon-carbon double bond.

35. A compound according to claim 13 wherein $R^2$ is acetoxy, $R^3$ is hydrogen, $R^6$ is β-fluoro, $R^7$ is methyl, Z is a carbon-carbon single bond and $Z^1$ is the group

36. A compound according to claim 13 wherein $R^2$ is acetoxy, $R^3$ is hydrogen, $R^6$ is β-fluoro, $R^7$ is methyl, Z is a carbon-carbon double bond and $Z^1$ is the group

37. Compounds according to claim 13 of the formula:

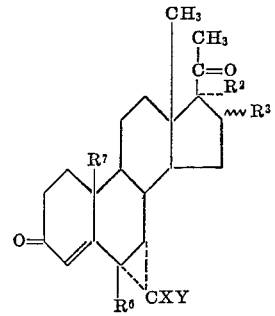

wherein each of $R^2$, $R^3$, $R^6$, $R^7$, X and Y is as defined therein.

38. Compounds according to claim 13 of the formula:

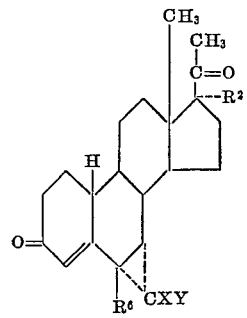

wherein each of $R^2$, $R^6$, X and Y is as defined therein.

39. Compounds according to claim 13 of the formula:

wherein each of $R^2$, $R^6$, X and Y is as defined therein.

40. Compounds of the formula:

wherein
$R^2$ is hydrogen, hydroxy or a hydrocarbon carboxylic acyloxy group of less than 12 carbon atoms;

$R^3$ is hydrogen or $\alpha$-methyl;
$R^7$ is hydrogen or methyl; and each of X and Y is chloro or fluoro.

References Cited

UNITED STATES PATENTS 3,047,566  7/1962  Godtfredsen et al. __ 260—239.55
3,200,113  8/1965  Christiansen et al. ___ 260—239.5
3,243,434  3/1966  Krakower _____ 260—239.55

HENRY A. FRENCH, Primary Examiner.

U.S. Cl. X.R.

260—239.5, 397.3, 397.4, 397.45, 397.47, 999

UNITED STATES PATENT OFFICE
CERTIFICATE OF CORRECTION

Patent No. 3,438,977                                April 15, 1969

Colin C. Beard et al.

It is certified that error appears in the above identified patent and that said Letters Patent are hereby corrected as shown below:

Column 3, line 18, "$F^4$" should read -- $R^4$ --. Column 6, line 43, "duoble" should read -- double --; line 44, "band" should read -- bond --. Column 8, line 50, "pregn4-" should read -- pregn-4- --. Column 9, line 55, "6,7-difluoromethylene-6β,11β-" should read -- 6,7-difluoromethylene-6β-fluoro-9α,11β- --. Column 12, line 5, "11β-17α,21-" should read -- 11β,17α,21- --; line 9, "fiuoro-" should read -- fluoro- --; line 10, "11β-" should read -- 11β, --. Column 15, line 17, "isoproyli-" should read -- isopropyli- --; line 38, "witth" should read -- with --. Column 17, lines 31 to 33, "The converted to the former with 2,3-dichloro-5,6-dicyanobenzoquinone or selenium dioxide." should read -- The latter compounds, preferably as the 21-acetate, may be converted to the former with 2,3-dichloro-5,6-dicyanobenzoquinone or selenium dioxide. --. Column 22, line 62, "19α-" should read -- -9α- --; lines 66 and 67, cancel "6,7-methylene-16α,-methylpregna-1,4-diene-11β,17α,21-triol-3,20-dione;". Column 23, line 55, "pregn-4-one" should read -- pregn-4-en-3-one --. Column 24, line 13, "diol-,2-dione" should read -- diol-3,20-dione --; same line 13, "0.3 ml." should read -- 0.38 ml. --; line 15, "the" should read -- ice --; line 21, "159 ml." should read -- 150 ml. --; line 57, "flloro" should read -- fluoro --. Column 26, line 43, "3,20-dione." should read -- 3,20-dione, --. Column 27, line 17, "-17β,20;20,21-" should read -- -17α,20;20,21- --. Column 30, lines 52 to 54, the group should appear as shown below:

$$\diagdown\!\!\diagup\!\!\!\!\diagup CF_2$$

Signed and sealed this 14th day of April 1970.

(SEAL)
Attest:

EDWARD M. FLETCHER, JR.                      WILLIAM E. SCHUYLER, JR.
Attesting Officer                                    Commissioner of Patents